US012742048B2

(12) United States Patent
Nakanishi et al.

(10) Patent No.: US 12,742,048 B2

(45) Date of Patent: Sep. 22, 2026

(54) MULTILAYER FILM AND METHOD FOR PRODUCING SAME

(71) Applicant: Toray Industries, Inc., Tokyo (JP)

(72) Inventors: Yuta Nakanishi, Otsu (JP); Keiko Sawamoto, Otsu (JP); Kazuyoshi Ota, Otsu (JP); Tadahiko Iwaya, Otsu (JP); Teruya Tanaka, Otsu (JP)

(73) Assignee: Toray Industries, Inc., Tokyo (JP)

( * ) Notice: Subject to any disclaimer, the term of this patent is extended or adjusted under 35 U.S.C. 154(b) by 215 days.

(21) Appl. No.: 18/267,178

(22) PCT Filed: Dec. 1, 2021

(86) PCT No.: PCT/JP2021/044092

§ 371 (c)(1),
(2) Date: Jun. 14, 2023

(87) PCT Pub. No.: WO2022/149377

PCT Pub. Date: Jul. 14, 2022

(65) Prior Publication Data

US 2024/0043640 A1 Feb. 8, 2024

(30) Foreign Application Priority Data

Jan. 5, 2021 (JP) ................................ 2021-000333
Mar. 30, 2021 (JP) ................................ 2021-056859
Aug. 4, 2021 (JP) ................................ 2021-127966

(51) Int. Cl.

*C08J 7/04* (2020.01)
*C04B 35/622* (2006.01)
*C08J 5/18* (2006.01)
*C08K 5/00* (2006.01)
*C08L 33/00* (2006.01)
*C08L 61/28* (2006.01)
*C08L 67/00* (2006.01)
*C09D 7/63* (2018.01)
*C09D 7/65* (2018.01)
*C09D 133/00* (2006.01)
*C09D 161/28* (2006.01)
*C09D 167/00* (2006.01)

(52) U.S. Cl.

CPC ....... *C08J 7/0423* (2020.01); *C04B 35/62218* (2013.01); *C08J 5/18* (2013.01); *C08J 2367/00* (2013.01); *C08J 2367/02* (2013.01); *C08J 2433/00* (2013.01); *C08K 5/0025* (2013.01); *C08L 33/00* (2013.01); *C08L 61/28* (2013.01); *C08L 67/00* (2013.01); *C08L 2666/16* (2013.01); *C08L 2666/18* (2013.01); *C08L 2666/20* (2013.01); *C09D 7/63* (2018.01); *C09D 7/65* (2018.01); *C09D 133/00* (2013.01); *C09D 161/28* (2013.01); *C09D 167/00* (2013.01)

(58) Field of Classification Search

None
See application file for complete search history.

(56) References Cited

U.S. PATENT DOCUMENTS 9,441,177 B2 9/2016 Bielecki et al.
2010/0028694 A1* 2/2010 Zhang .................. C08G 18/672 977/773
2010/0160562 A1 6/2010 Beppu et al.
2012/0059125 A1* 3/2012 Imoto ........................ C08J 5/18 525/127
2016/0076134 A1* 3/2016 Tokunaga ................. B32B 9/00 204/192.1
2016/0222178 A1* 8/2016 Funatsu ................... C08J 7/043
2017/0362469 A1* 12/2017 Sherman .................... C09J 7/22
2018/0029329 A1 2/2018 Hirano et al.
2019/0176188 A1* 6/2019 Rodriguez ............... C09D 5/00
2019/0284357 A1* 9/2019 Merrill .................... B32B 27/16
2020/0335360 A1* 10/2020 Shoji ..................... B32B 27/281

(Continued)

FOREIGN PATENT DOCUMENTS

EP 3 029 092 A1 6/2016
JP 6386789 A 4/1988
JP 02173080 A 7/1990

(Continued)

OTHER PUBLICATIONS

JP 2020-152095 A (Sawamoto et al) (published Sep. 24, 2020) (English machine translation) 2020 (Year: 2020).*

(Continued)

*Primary Examiner* — Vivian Chen

(74) *Attorney, Agent, or Firm* — Buchanan Ingersoll & Rooney PC

(57) ABSTRACT

A laminated film including a resin layer on at least one side of a resin base film, the resin layer being present at least one surface, wherein the X-ray absorption near edge structure (XANES) spectrum at the carbon K absorption edge at the resin layer surface satisfies I (15°)−I (90°)≥0.1 when the angle formed between the incident X-ray and the resin layer surface is defined as θ, and the spectral intensity at 293.5 eV obtained by the partial electron yield method is defined as I (θ). Provided is a laminated film as a release film to be used in an application that is carried out by coating the film with a coating liquid including a solvent, drying and solidifying the coating liquid, and then peeling off the solidified coating, which laminated film shows excellent applicability and an excellent peeling property, and does not show delamination of the surface layer even after a heating process.

12 Claims, No Drawings

(56) References Cited

U.S. PATENT DOCUMENTS

| | | | |
|---|---|---|---|
| 2021/0277197 A1 | 9/2021 | Aono et al. | |

FOREIGN PATENT DOCUMENTS

| | | | | |
|---|---|---|---|---|
| JP | 2003183619 | A | | 7/2003 |
| JP | 2004351627 | A | | 12/2004 |
| JP | 2010144046 | A | | 7/2010 |
| JP | 2010155459 | A | | 7/2010 |
| JP | 2014514583 | A | | 6/2014 |
| JP | 2017170660 | A | | 9/2017 |
| JP | 2019139168 | A | | 8/2019 |
| JP | 2019162874 | A | | 9/2019 |
| JP | 2019209528 | A | | 12/2019 |
| JP | 2020152095 | A | | 9/2020 |
| WO | 2016136759 | A1 | | 9/2016 |
| WO | 2018037991 | A1 | | 3/2018 |
| WO | WO 2019-131163 | A1 | * | 4/2019 |
| WO | 2020/017289 | A1 | | 1/2020 |
| WO | 2020/129962 | A1 | | 6/2020 |

OTHER PUBLICATIONS

International Search Report and Written Opinion for International Application No. PCT/JP2021/044092, dated Feb. 15, 2022, 11 pages.

Mori et al., "Effect of the Interfacial Structures of Alkyl-Side-Chain Polymer Films on the Peel Force", International Journal of Adhesion and Adhesives, (Apr. 1, 2018), vol. 82, pp. 166-172.

Mori, "Correlation between Structure and Peeling Force of Alkyl-Pendant Polymer Membrane", Doctoral Dissertation, (Mar. 1, 2019), pp. 1-101 and an English translation. (124 pages).

English Translations of the International Search Report (Form PCT/ISA/210) and the Written Opinion of the International Searching Authority (Form PCT/ISA/237) and an English translation issued Feb. 15, 2022, by the Japan Patent Office in corresponding International Application No. PCT/JP2021/044092. (19 pages).

Extended European Search Report issued Oct. 17, 2024, by the European Patent Office in corresponding European Patent Application No. 21917598.1-1102. (9 pages).

* cited by examiner

MULTILAYER FILM AND METHOD FOR PRODUCING SAME

CROSS REFERENCE TO RELATED APPLICATIONS

This is the U.S. National Phase application of PCT/JP2021/044092, filed Dec. 1, 2021, which claims priority to Japanese Patent Application No. 2021-000333, filed Jan. 5, 2021, Japanese Patent Application No. 2021-056859, filed Mar. 30, 2021 and Japanese Patent Application No. 2021-127966, filed Aug. 4, 2021, the disclosures of each of these applications being incorporated herein by reference in their entireties for all purposes.

FIELD OF THE INVENTION

The present invention relates to a laminated film comprising a resin layer on at least one side of a polyester film, and a method of producing the laminated film.

BACKGROUND OF THE INVENTION

Biaxially drawn polyester films have excellent characteristics in mechanical properties, electric properties, dimensional stability, transparency, chemical resistance, and the like. Therefore, these films are widely used as base material films in a number of uses such as magnetic recording materials and wrapping materials. In recent years, films having an excellent release property are especially highly demanded as protection films for adhesion material layers in adhesive products, and as carrier films for the processing processes of a variety of industrial products. As the films having an excellent release property, films having a surface that is provided with a layer (hereinafter referred to as resin layer) comprising, as a release agent, a silicone compound have been most commonly used (see, for example, Patent Document 1) from the viewpoint of industrial productivity and heat resistance. However, since inclusion of a silicone compound in the resin layer leads to decreased surface free energy of the resin layer, applicability of an adherend may be poor in some cases.

This is especially the case where the films are used as processing films for the production of electronic components. In this case, the process includes applying a surface layer such as a ceramic slurry onto a resin layer of a polyester film, drying the surface layer, and then peeling off the dried surface layer from the polyester film. In cases where the resin layer comprises a silicone compound in this process, the silicone compound may cause a problem such as cissing or pin hole formation during the application of the surface layer to the resin layer. Even in cases where no serious problem occurs during the coating, the silicone compound transfers to the surface-layer side when the surface layer is peeled off from the polyester film. Gradual vaporization of this silicone compound leads to, for example, its deposition on a surface of an electric contact point of an electronic component due to, for example, the ark generated in the vicinity of the electric contact point, resulting in an adverse effect on the performance of the electronic component, such as poor conductivity.

In order to solve such problems, studies have been carried out on the use of a long-chain alkyl group-containing resin, an olefin resin, a fluorine compound, or a wax compound, especially a long-chain alkyl group-containing resin, as a release agent containing no silicone compound (hereinafter referred to as non-silicone release agent) (see, for example Patent Documents 2 to 6).

PATENT DOCUMENTS

Patent Document 1: JP 2010-155459 A
Patent Document 2: JP 2017-170660 A
Patent Document 3: JP 2010-144046 A
Patent Document 4: JP 2004-351627 A
Patent Document 5: WO 2018/037991
Patent Document 6: JP 2020-152095 A

SUMMARY OF THE INVENTION

However, there is a problem that non-silicone release agents are more likely to suffer from heavy peeling compared to release agents comprising a silicone compound. For example, when the film described in Patent Document 2 was studied by the present inventors, it was found that application of a surface layer to the resin layer causes penetration of a surface-layer component into the resin layer, resulting in heavy peeling in terms of the peel strength of the surface layer.

It was also found that, even in cases where a long-chain alkyl group-containing resin is included in a film, such as the cases of the films described in Patent Documents 3, 4, and 5, sufficiently high orientation of the long-chain alkyl group in the resin layer cannot be achieved depending on the processing conditions, resulting in heavy peeling in terms of the peel strength for the surface layer, which is problematic. On the other hand, in a method using a long-chain alkyl acrylate resin and a melamine resin in combination, such as the case of Patent Document 6, the resin layer can be highly cross-linked, but the surface free energy of the resin layer becomes too high. It was therefore found that a sufficient release property cannot be imparted, and that, as a result, a ceramic slurry cannot be easily peeled off, which is problematic. Further, since a long-chain alkyl group-containing resin has strong hydrophobicity, and its aqueous dispersion is unstable and likely to show aggregation, the resin layer tends to contain aggregates. As a result of transfer of coarse projections formed by the aggregates to the layer provided by the application, the layer provided by the application had high surface roughness in some cases.

It was also found that, even in cases where a light-peeling design can be obtained, delamination of the slurry may occur due to thermal expansion of the resin layer upon exposure to high temperature in a drying step or the like, causing a problem in the processing in a post-process. The delamination herein means the phenomenon that detachment of the applied ceramic slurry partially occurs.

In view of this, an object of the present invention is to solve the above drawbacks by providing a laminated film which shows excellent applicability for a coating agent composition, represented by a ceramic slurry, that forms a layer to be provided by its application, which laminated film also shows an excellent peeling property for the layer provided by the application (surface layer), and which laminated film, in particular, has excellent transferability and smoothness due to the fact that the resin layer comprises only a small amount of aggregates. Another object is to provide a laminated film that achieves both a light-peeling property between the surface layer and the resin layer, and suppression of delamination of the surface layer after exposure to high-temperature conditions.

For solving the above problems, the laminated film of the present invention has any of the following constitutions:

a laminated film comprising a resin layer on at least one side of a resin base film, the resin layer being present at least one surface, wherein in an X-ray absorption fine structure (XAFS) spectrum measured for the resin layer surface by the partial electron yield method, an X-ray absorption near edge structure (XANES) spectrum at the carbon K absorption edge satisfies I (15°)−I (90°) ≥0.1 when the angle formed between the incident X-ray and the resin layer surface is defined as θ, and the spectral intensity at 293.5 eV is defined as I (θ) (which may be hereinafter referred to as first mode); or a laminated film comprising a resin layer placed on at least one side of a resin base film, the laminated film having a tape peel strength of not more than 3.0 N/19 mm, and having a domain size of not more than 500 nm as observed in a modulus mapping image by AFM (which may be hereinafter referred to as second mode).

The method of producing the laminated film of the present invention has the following constitution:

a method of producing the laminated film, the method comprising:

applying a coating agent composition comprising: a release agent (A); and at least one resin or compound selected from epoxy resins, oxazoline compounds, carbodiimide compounds, polyester resins, acrylic resins, and urethane resins (B); to at least one side of the resin base film;

subsequently drawing the film in a uniaxial direction; and then heating the film to not less than 150° C., to allow formation of the resin layer.

In the laminated film of the present invention, the surface elastic modulus of the resin layer as measured using an atomic force microscope (AFM) is preferably not less than 1 GPa.

The laminated film of the present invention is preferably a laminated film comprising a resin layer placed on at least one side of a resin base film, the laminated film having a tape peel strength of not more than 3.0 N/19 mm, and having a domain size of not more than 500 nm as observed in a modulus mapping image by an atomic force microscope (AFM).

In the laminated film of the present invention, the resin layer preferably has a water contact angle of not less than 85° to not more than 110°.

In an X-ray absorption fine structure (XAFS) spectrum measured for the resin layer surface of the laminated film according to embodiments of the present invention by the partial electron yield method, an X-ray absorption near edge structure (XANES) spectrum at the carbon K absorption edge preferably satisfies [I (15°)−0.1]/I (90°)>1 when the angle formed between the incident X-ray and the resin layer surface is defined as θ, and the spectral intensity at 293.5 eV is defined as I (θ).

When the surface of the resin layer of the laminated film of the present invention is analyzed by time-of-flight secondary ion mass spectrometry, the ratio of the peak intensity of the fragment derived from polydimethylsiloxane (P) to the peak intensity of the fragment detected at the highest intensity (K)(P/K)[−] is preferably less than 0.01.

In the laminated film of the present invention, the resin layer preferably comprises a long-chain alkyl resin as a release agent (A), and, when the long-chain alkyl resin is heated from 25° C. to 200° C. at 20° C./min and then cooled from 200° C. to −50° C. at using a differential scanning calorimeter (DSC), the exothermic peak temperature (Tc) in the cooling process is preferably not less than 30° C.

In the laminated film of the present invention, the resin layer is preferably formed from a coating agent composition comprising: a release agent (A); and at least one resin or compound selected from epoxy resins, oxazoline compounds, carbodiimide compounds, polyester resins, acrylic resins, and urethane resins (B).

In the laminated film of the present invention, the resin layer preferably has a film thickness of more than 10 nm and less than 200 nm.

In the laminated film of the present invention, the resin base film is preferably a polyester film.

The laminated film of the present invention is preferably used in an application that is carried out by applying a ceramic slurry to the surface of the resin layer, solidifying the ceramic slurry, and then peeling off the solidified ceramic slurry.

The present invention can provide a laminated film which shows excellent applicability for a coating agent composition, represented by a ceramic slurry, that forms a layer to be provided on a resin layer by its application, which laminated film also shows an excellent peeling property for the layer provided by the application, and which laminated film has excellent transferability and smoothness due to the fact that the resin layer comprises only a small amount of aggregates. The present invention can also provide a laminated film that achieves both a light-peeling property between the surface layer and the resin layer, and suppression of delamination of the surface layer after exposure to high-temperature conditions.

A first mode of the laminated film according to embodiments of the present invention is a laminated film comprising a resin layer on at least one side of a resin base film, the resin layer being present at least one surface, wherein the XANES spectrum at the carbon K absorption edge at the resin layer surface satisfies I (15°)−I (90°)≥0.1 in terms of the relationship between I (15°) and I (90°) at θ=15° and θ=90° when the angle formed between the incident X-ray and the resin layer surface is defined as θ, and the spectral intensity at 293.5 eV obtained by the partial electron yield method is defined as I (θ). First, the meanings of these physical properties and examples of their control methods are described below.

The XANES spectrum in the present invention means the X-ray absorption near edge structure spectrum at the carbon K absorption edge in an X-ray absorption fine structure (XAFS) spectrum obtained by irradiating the resin layer surface of the laminated film of the present invention with X-ray and measuring the amount of absorption of the X-ray. The measurement conditions for the XAFS spectrum are described later.

The XAFS spectrum is obtained by measuring the amount of X-ray absorption while changing the energy of the X-ray radiation. Since different elements show different levels of the absorbed energy, the measurement enables acquisition of information including the binding state (valency) and the coordination environment (the interatomic distance and the coordination number) of each element. The present invention focuses on the carbon K absorption edge near 284.2 eV, more specifically, the peak at 293.5 eV, which is attributable to the σ* transition of the C—C bond.

X-ray shows linear polarization, and occurrence of an electric field vector within the perpendicular or horizontal plane with respect to the X-ray. Since the X-ray absorption intensity of the measurement sample herein depends on the directions of the electric field vector and the bond axis, evaluation of the orientation of the C—C bond is possible by carrying out angle-resolved measurement for the peak at 293.5 eV, which is attributable to the C—C-bond. In embodiments of the present invention, the angle formed between the incident X-ray and the measurement sample surface is defined as θ, and the X-ray absorption spectral intensity at 293.5 eV is defined as I (θ).

At θ=15°, the X-ray electric field vector is almost perpendicular to the resin surface. At θ=90°, the X-ray electric field vector is almost parallel to the resin surface. Thus, the higher the value of I (15°)−I (90°), the higher the degree of orientation of the C—C bond toward the direction perpendicular to the resin surface. This can be an index of the perpendicular orientation of a long-chain alkyl group in a resin layer comprising a long-chain alkyl resin.

Regarding the method of detecting the absorption spectrum, measurement by the transmission method, in which the intensity is measured before and after the sample irradiated with X-ray, is commonly employed. However, since the carbon K absorption edge in the present invention is an energy range called soft X-ray, most of the X-ray energy is absorbed in the substance, so that a detection method such as the electron yield method, fluorescence yield method, or ion yield method may be employed. The present invention employs the electron yield method, in particular, the partial electron yield method, since the latter enables acquisition of information in the vicinity of the surface.

The total electron yield method is a method in which a substance is irradiated with soft X-ray having a higher energy than the inner-shell orbital binding energy, to cause release of inner-shell orbital electrons as photoelectrons from the substance surface by the photoelectric effect, wherein all released electrons are detected without energy selection. A method in which electrons having a kinetic energy higher than a certain energy are selected is called the partial electron yield method. In the partial electron yield method, electron energies released from the surface are selected using an electron spectrometer such that electrons with low kinetic energies, that is, electrons that exhibit long mean free paths in the substance, are not detected. Therefore, the partial electron yield method is more surface-sensitive than the total electron yield method, and enables analysis of the sample surface to a depth of several nanometers.

Since the first mode of the laminated film according to embodiments of the present invention satisfies I (15°)−I (90°)≥0.1, the film can achieve both excellent applicability for a coating agent composition that forms a layer to be provided on the resin layer by application or the like (the layer to be provided on the surface of the resin layer of the laminated film of the present invention by application or the like may be hereinafter referred to as surface layer), and an excellent peeling property between the resin layer and the surface layer.

As described above, a laminated film comprising a resin layer is used, in some cases, as a carrier film for the processing processes of a variety of industrial products. In such processes, a surface layer comprising a solvent is applied onto the resin layer of the laminated film, dried, and then peeled off from the laminated film. By the application of the coating liquid for forming the surface layer to the resin layer of the laminated film, penetration of a component of the surface layer into the resin layer may occur.

In cases where perpendicular orientation of the long-chain alkyl group of the resin layer surface of the laminated film is insufficient, penetration of a component of the surface layer cannot be suppressed at the surface of the resin layer, resulting in heavy peeling in terms of the peel strength of the surface layer due to the anchor effect between the surface layer and the resin layer. The fact that the resin layer of the first mode of the laminated film according to embodiments of the present invention satisfies I (15°)−I (90°)≥0.1 means a high degree of perpendicular orientation of the long-chain alkyl group of the resin layer. Because of this, the penetration of a component of the surface layer into the resin layer is less likely to occur, and hence a favorable peeling property of the surface layer can be achieved. The range of I (15°)−I (90°) is preferably I (15°)−I (90°)≥0.2, more preferably I (15°)−I (90°)≥0.4. In cases of I (15°)−I (90°)<0.1, the long-chain alkyl group of the resin layer is not perpendicularly oriented. Therefore, application of the surface layer to the resin layer results in penetration of a component of the surface layer into the resin layer, and hence the peeling property of the surface layer becomes poor due to occurrence of the anchor effect between the resin layer and the surface layer. Although the upper limit of I (15°)−I (90°) is not restricted, the upper limit is usually about 1.0.

Examples of a method of satisfying I (15°)−I (90°)≥0.1 in the resin layer of the laminated film according to embodiments of the present invention include control by the components contained in the resin layer, the coating agent compositions, and the production methods described later. Their preferred ranges are described later.

The second mode of the laminated film according to embodiments of the present invention is a laminated film comprising a resin layer on at least one side of a resin base film, the laminated film having a tape peel strength of not more than 3.0 N/19 mm, and having a domain size of not more than 500 nm as observed in a modulus mapping image by an atomic force microscope (AFM). The meanings of these properties and examples of their control methods are described below.

In cases where occurrence of delamination of the surface layer is to be suppressed even after exposure to high-temperature conditions, the second mode of the laminated film according to embodiments of the present invention needs to have a tape peel strength of not more than 3.0 N/19 mm, and to have a domain size of not more than 500 nm as observed in a modulus mapping image by AFM. By this, a light-peeling property between the surface layer and the resin layer, and suppression of delamination at high temperature, can both be achieved, so that film breakage of the surface layer during the peeling process can be prevented.

The tape peel strength in the second mode of the laminated film according to embodiments of the present invention is preferably not more than 2.5 N/19 mm, more preferably not more than 2.0 N/19 mm. Although the lower limit of the tape peel strength is not restricted, the lower limit is preferably 0.01 N/19 mm from the viewpoint of suppressing film detachment of the surface layer provided on the resin layer, during the roll transport process. The tape peel strength represents the interaction between the resin layer and the surface layer. By decreasing the interaction between the resin layer and the surface layer, the peel force for the surface layer can be reduced. In cases where the tape peel strength exceeds 3.0 N/19 mm, failure in the peeling-off of the surface layer from the resin layer may occur to cause film breakage in the process of peeling-off of the surface layer, resulting in a low yield.

The tape peel strength in the present invention is defined as follows. First, an acrylic polyester adhesive tape (manufactured by Nitto Denko Corporation; Nitto 31B Tape; 19 mm in width) is attached to the resin layer of the laminated film of the present invention, and a 2-kgf roller is moved back and forth one time thereon. Thereafter, the laminated film having the tape attached thereto is left to stand in an environment at 25° C. at 65% RH for 24 hours, and then the tape is peeled off at a peeling angle of 180° and a tensile rate of 300 mm/minute using a universal testing machine "Autograph AG-1S", manufactured by Shimadzu Corporation. The peeling load at this time was defined as the tape peel strength. The method of measuring the tape peel strength is more concretely described later.

Examples of a method of controlling the tape peel strength to within the preferred range include a method in which a release agent is included in the resin layer to decrease the surface free energy. Details of preferred release agents are described later. In particular, as the release agent, a long-chain alkyl resin is preferably used since, when the resin is crystallized in a state where it is perpendicularly orientated with respect to the surface, a methyl group, which has a low surface free energy, is exposed on the surface.

In cases where the laminated film according to embodiments of the present invention has a domain size of not more than 500 nm as observed in a modulus mapping image by AFM, a laminated film that achieves both a light-peeling property between the surface layer and the resin layer, and suppression of delamination at high temperature, can be obtained. The reason is thought to be as follows.

In cases where the resin layer is formed with a release agent (such as a long-chain alkyl resin) and a resin other than a release agent (a resin or compound, such as an epoxy resin, an oxazoline compound, a carbodiimide compound, a melamine resin, a polyester resin, an acrylic resin, or a urethane resin), the release agent may be locally and nonuniformly distributed in the surface of the resin layer, to cause formation of a domain. While the amount of the release agent is relatively large in the domain, the amount of the release agent is relatively small in the portions other than the domain. Therefore, after the application of the surface layer onto the resin layer, peeling between the resin layer and the surface layer may be heavy peeling. Moreover, in the domain, film detachment or delamination may occur due to thermal expansion of the resin layer under a high-temperature environment.

The domain size is preferably not more than 250 nm, more preferably not more than 100 nm. In cases where the domain size is more than 500 nm, the relative amount of the cross-linking agent in the domain may be small. This may cause penetration of a component of the surface layer into the resin layer, leading to heavy peeling due to the anchor effect, and/or occurrence of film detachment or delamination due to thermal expansion under a high-temperature environment. Although the lower limit of the domain size is not restricted, the lower limit may be about 10 nm.

Examples of a method of achieving a tape peel strength of not more than 3.0 N/19 mm, and a domain size of not more than 500 nm as observed in an AFM modulus mapping image, in the laminated film according to embodiments of the present invention include control by the components contained in the resin layer, the coating agent compositions, and the production methods described later. Their preferred ranges are described later.

A detailed description of the laminated film of the present invention is given below.

<Resin Base Film>

The resin base film in the laminated film according to embodiments of the present invention is described below in detail. The resin base film is not limited, and the resin species contained in the resin base film may be either a thermoplastic resin or thermosetting resin, may be a homopolymer resin, or may be a copolymer resin or a blend of two or more kinds of resins. From the viewpoint of achieving favorable moldability, a thermoplastic resin is preferred.

Examples of the thermoplastic resin include, but are not limited to, polyolefins such as polyethylene, polypropylene, polystyrene, and polymethylpentene; alicyclic polyolefins; polyamides such as nylon 6 and nylon 66; aramids; polyimides; polyesters; polycarbonates; polyarylates; polyacetals; polyphenylene sulfides; fluorocarbons such as tetrafluoroethylene, trifluoroethylene, chlorotrifluoroethylene, tetrafluoroethylene-hexafluoropropylene copolymer, and vinylidene fluoride; acryl; methacryl; polyacetal; polyglycolic acid; and polylactic acid. Examples of the thermosetting resin include phenolic resins, epoxy resins, urea resins, melamine resins, unsaturated polyesters, polyurethanes, polyimides, and silicone resins. From the viewpoint of mechanical properties and moldability, polyesters are especially preferred.

Polyester is a general term for macromolecules having ester bonds as main bonding chains of the backbone, and examples of polyester include ethylene terephthalate, propylene terephthalate, ethylene-2,6-naphthalate, butylene terephthalate, propylene-2,6-naphthalate, and ethylene-α,β-bis(2-chlorophenoxy)ethane-4,4-dicarboxylate. As the resin base film, a resin base film comprising at least one of these resins as a major component may be preferably used. In particular, polyethylene terephthalate is preferably used. In cases where heat, shrinkage stress, or the like acts on the resin base film, polyethylene-2,6-naphthalate is more preferably used since it has excellent heat resistance and rigidity.

In addition to the above resin species, additives such as an antioxidant, a thermal stabilizer, a weathering stabilizer, an ultraviolet absorber, an organic lubricant, a pigment, a dye, an organic or inorganic particle, a filler, an antistatic agent, a nucleating agent, and/or the like may be added as long as the additives do not deteriorate the properties of the resin base film.

The resin base film preferably comprises a polyester as a major component from the viewpoint of mechanical properties and thermal properties (a resin base film comprising a polyester as a major component may be hereinafter referred to as a polyester film). The term "comprises as a major component" means that the component is the most abundant component among the components contained in the resin base film.

The polyester film is preferably biaxially oriented. The biaxially oriented polyester film generally means a polyester film obtained by drawing a film in an undrawn state toward each of the longitudinal direction and the width direction perpendicular to the longitudinal direction at a draw ratio of about 2.5 to 5, and subjecting the drawn film to heat treatment to complete the crystalline orientation such that the resulting film shows a biaxially oriented pattern in wide-angle X-ray diffraction. A biaxially oriented polyester film is preferred from the viewpoint of the thermal stability of the laminated film, especially from the viewpoint of the dimensional stability, mechanical strength, and flatness.

The polyester film may be a laminated structure having two or more layers in the polyester film. Examples of the laminated structure include a composite film having not less than three layers in which an inner layer portion does not substantially contain a particle, and in which a surface layer portion contains a particle, wherein the polymers of the inner layer portion and the surface layer portion may be chemically the same or different.

The thickness of the polyester film is not limited, and is appropriately selected depending on the use and the type. From the viewpoint of the mechanical strength, ease of handling, and the like, the thickness is preferably 10 to 500 more preferably 23 to 125 most preferably 38 to 75 The polyester film may be a composite film prepared by coextrusion, or may be a film prepared by attaching obtained films to each other by a certain method. In the present description, " . . . to . . . " representing a value range means "not less than . . . and not more than . . . ", including the lower limit value and the upper limit value.

<Resin Layer>

The resin layer in the laminated film according to embodiments of the present invention is present on at least one side of the resin base film. The resin layer is a layer necessary for ease of peeling-off of an adhesive tape provided on the resin layer, or the later-described surface layer formed from a ceramic slurry, from the laminated film.

In the laminated film according to embodiments of the present invention, the surface elastic modulus of the resin layer as measured using an atomic force microscope (AFM) is preferably not less than 1 GPa. The value of the surface elastic modulus is more preferably not less than 1.5 GPa, still more preferably not less than 2.0 GPa. A surface elastic modulus within the preferred range indicates that the resin layer is sufficiently cross-linked. In this case, penetration of a component of the surface layer into the resin layer can be suppressed to achieve light peeling in terms of the peel strength of the surface layer, and the tape peel strength. Although the upper limit of the surface elastic modulus is not restricted, the upper limit may be about 10 GPa from the viewpoint of preventing breakage of the resin layer due to bending of the laminated film.

The measurement of the elastic modulus by AFM herein is a compression test for an ultra-small portion using a probe, based on the degree of deformation due to the indentation force. Therefore, the surface elastic modulus of the resin layer and its spatial distribution can be measured using a cantilever whose constant of spring is known. Details of the measurement are described in the Examples section. The measurement can be carried out using the atomic force microscope described below, by bringing the probe at the tip of the cantilever into contact with the resin layer, and measuring the force curve. In this process, information from the depth direction of the coating film can be obtained in accordance with the indentation depth. In general, the material present at a depth of up to about 5 to 10 times the setting value of the indentation depth affects the measurement. Thus, in cases where the indentation depth is set to 1/10 with respect to the thickness of the resin layer, the properties of the resin layer become dominant over the influence of the resin base film that is the substrate. The spatial resolution in the plane direction depends on the scan range and the scan line number of the atomic force microscope. Under practical measurement conditions, the lower limit of the spatial resolution in the plane direction is about 50 nm. Details of the measurement and the measurement method are described later.

In the laminated film according to embodiments of the present invention, the resin layer preferably has a water contact angle of 85° to 110°. In cases where the water contact angle of the resin layer of the laminated film according to embodiments of the present invention is not less than 85°, a favorable release property can be given to the laminated film. In cases where the water contact angle of the resin layer of the laminated film according to embodiments of the present invention is not more than 110°, light peeling in terms of the peel strength of the surface layer or the tape, and favorable applicability of the ceramic slurry, can both be achieved, and moreover, natural detachment of the ceramic slurry from the resin layer can be prevented. The water contact angle is more preferably 92° to 108°, still more preferably 96° to 106°.

The water contact angle in the present invention is determined by the static drop method described in JIS R 3257: 1999. The water contact angle is a value that can be determined according to the following equation when a water droplet placed on a solid surface shows equilibrium under its atmosphere. In general, the value can be an index for judging wettability of the solid surface. More specifically, the lower the value of the water contact angle, the better the wettability of the solid surface. The higher the value, the poorer the wettability.

$$\gamma S=\gamma L \cos \theta+\gamma SL$$

(In the above equation, $\gamma S$ represents the surface tension of the solid; $\gamma L$ represents the surface tension of the liquid; $\gamma SL$ represents the interfacial tension of the solid/liquid; and $\theta$ represents the contact angle.)

The equation is called "Young's equation", and the angle formed between the liquid surface and the solid surface is defined as "contact angle". The water contact angle can be measured by a widely commercially available apparatus, for example, by a Contact Angle Meter (manufactured by Kyowa Interface Science Co., Ltd.). The value range of the water contact angle, and the measurement method therefor are more concretely described later.

In an XAFS spectrum measured for the resin layer of the laminated film according to embodiments of the present invention by the partial electron yield method, an X-ray absorption near edge structure (XANES) spectrum at the carbon K absorption edge preferably satisfies [I (15°)−0.1]/I (90°)>1 when the angle formed between the incident X-ray and the resin layer surface is defined as θ, and the spectral intensity at 293.5 eV is defined as I (θ). The XANES spectrum more preferably satisfies [I (15°)−0.1]/I (90°)>1.2, still more preferably satisfies [I (15°)−0.1]/I (90°)>1.4. In cases where [I (15°)−0.1]/I (90°) is within the preferred range described above, the tape peel strength and the peel strength of the surface layer can be favorable.

In time-of-flight secondary ion mass spectrometry (GCIB-TOF-SIMS) of the resin layer of the laminated film according to embodiments of the present invention, the ratio of the peak intensity of the fragment derived from polydimethylsiloxane (P) to the peak intensity of the fragment detected at the highest intensity (K)(P/K)[−] is preferably less than 0.01. In cases where the ratio of the peak intensity is less than the content of the component derived from polydimethylsiloxane in the resin layer is small. Therefore, in the use of the laminated film according to embodiments of the present invention as a processing film for the production of an electronic component, transfer of silicone compounds (especially polydimethylsiloxane) to the product side does not occur, so that troubles such as poor conductivity can be prevented. In the time-of-flight secondary ion mass spectrometry, the ratio of the peak intensity of the fragment derived from polydimethylsiloxane (P) to the peak intensity of the fragment detected at the highest intensity (K)(P/K)[−] can be determined by the measurement method described in the Examples section.

The resin layer of the laminated film according to embodiments of the present invention preferably comprises a long-chain alkyl group-containing resin as a release agent (A), and, when the long-chain alkyl group-containing resin is heated from 25° C. to 200° C. at 20° C./min and then cooled from 200° C. to −50° C. at 20° C./min using a differential scanning calorimeter (DSC), the exothermic peak temperature (Tc) in the cooling process is more preferably not less than 30° C., still more preferably not less than most preferably not less than 45° C. In cases where the exothermic peak temperature Tc is not less than 30° C., the long-chain alkyl group in the release agent (A) is likely to be perpendicularly oriented, so that I (15°)−I (90°)≥0.1 can be satisfied.

The resin layer of the laminated film according to embodiments of the present invention may comprise, in addition to the release agent (A), at least one resin or compound selected from epoxy resins, oxazoline compounds, carbodiimide compounds, polyester resins, acrylic resins, and urethane resins (B) as long as the applicability and the release property are not deteriorated. Details of the resin or compound are described in the Coating Agent Composition section.

The resin layer of the laminated film according to embodiments of the present invention preferably has a film thickness of more than 10 nm and less than 200 nm. In cases where the film thickness of the resin layer is more than 10 nm and less than 200 nm, a uniform resin layer showing a favorable applicability and release property can be easily provided on the base film resin. In cases where the film thickness of the resin layer is less than 200 nm, the production cost can be suppressed, and moreover, occurrence of unevenness and streaks during the application of the resin layer can be suppressed, so that the quality of the laminated film can be maintained. Further, by increasing the film thickness of the resin layer to more than 10 nm, a decrease in the release property can be suppressed.

<Surface Layer>

The laminated film according to embodiments of the present invention is preferably used by forming a surface layer on the resin layer. The surface layer herein means a layer-shaped molded body comprising a resin, metal, ceramic, or the like formed on the side of the laminated film where the resin layer is present. The method of preparing the surface layer is not limited. The surface layer may be formed on the surface of the resin layer by a method such as application, vapor deposition, attachment, or the like. In the present description, in cases where a coating liquid comprising a solvent component is used for the preparation of the surface layer, or where the surface layer is a hardened layer formed by reacting with a reactive active site, "surface layer" may include those in an undried state or an unhardened state. In an especially preferred use in the present invention, the surface layer is a ceramic sheet formed through a process of coating with a ceramic slurry.

<Coating Agent Composition>

Coating agent compositions preferred for the formation of the resin layer of the laminated film of the present invention are described below. The resin layer of the laminated film according to embodiments of the present invention is preferably formed from a coating agent composition comprising: a release agent (A); and at least one resin or compound selected from epoxy resins, oxazoline compounds, carbodiimide compounds, melamine resins, polyester resins, acrylic resins, and urethane resins (B). Such a constitution enables easy formation of a resin layer in which the X-ray absorption near edge structure (XANES) spectrum at the carbon K absorption edge of the resin layer surface satisfies I (15°)−I (90°)≥0.1 when the angle formed between the incident X-ray and the resin layer surface is defined as θ, and the spectral intensity at 293.5 eV obtained by the partial electron yield method is defined as I (θ). Such a constitution also enables easy formation of a resin layer having a tape peel strength of not more than 3.0 N/19 mm, and having a domain size of not more than 500 nm as observed in a modulus mapping image by AFM.

<Release Agent (A)>

The release agent (A) in the present invention means a compound that is to be included in the coating agent composition in order to give a release property (that is, a property that decreases the surface free energy of the resin and/or the peel strength of the resin layer) to the surface of the coated layer. Examples of a release agent (A) that may be used in embodiments of the present invention include long-chain alkyl group-containing resins, olefin resins, fluorine compounds, and wax compounds. In particular, long-chain alkyl group-containing resins are preferred from the viewpoint of giving a favorable peeling property. In cases where a long-chain alkyl resin is used, segregation of the long-chain alkyl resin, having a low surface free energy, at the surface of the resin layer occurs, and the resin is crystallized in a state where it is perpendicularly orientated with respect to the surface. As a result, the end methyl group is exposed on the surface to decrease the surface free energy, resulting in achievement of the light-peeling property.

As the long-chain alkyl group-containing compound, a commercially available product may be used. Specific examples of such a product include "ASHIO RESIN" (registered trademark), which is a long-chain alkyl compound manufactured by Ashio-Sangyo Co., Ltd., "Peeloil" (registered trademark), which is a long-chain alkyl compound manufactured by Lion Specialty Chemicals Co., Ltd., and the Resem Series, which is an aqueous dispersion of a long-chain alkyl compound manufactured by Chukyo Yushi Co., Ltd.

The release agent (A) is preferably a resin comprising an alkyl group having not less than 12 carbon atoms, more preferably a resin comprising an alkyl group having not less than 16 carbon atoms. In cases where the number of carbon atoms of the alkyl group is not less than 12, hydrophobicity increases to promote orientation of the alkyl chain on the surface, thereby allowing expression of a sufficient release property. There is no upper limit of the number of carbon atoms of the alkyl group. However, the number of carbon atoms is preferably not more than 25 from the viewpoint of ease of the production.

Further, the distance between the Hansen solubility parameter (HSP value) of the release agent (A) and the HSP value of the at least one resin or compound selected from epoxy resins, oxazoline compounds, carbodiimide compounds, polyester resins, acrylic resins, and urethane resins (B) is preferably not more than 14 $MPa^{1/2}$. The distance is more preferably not more than 12 $MPa^{1/2}$, still more preferably not more than 10 $MPa^{1/2}$. In cases where the HSP distance is within the preferred range described above, compatibility between the release agent (A) and the at least one resin or compound selected from epoxy resins, oxazoline compounds, carbodiimide compounds, melamine resins, polyester resins, acrylic resins, and urethane resins (B) increases to allow uniform dispersion of the release agent (A) in the resin layer. The HSP distance may be controlled to within the preferred range described above by, for example, a method in which the copolymer composition ratio of the release agent (A) is controlled, or a method using a release agent (A) having a molecular structure compatible with the at least one resin or compound selected from epoxy resins, oxazoline compounds, carbodiimide compounds, melamine resins, polyester resins, acrylic resins, and urethane resins (B).

The release agent (A) is more preferably a block copolymer that comprises a unit comprising an alkyl group. In cases where the release agent is a block copolymer that comprises a unit comprising an alkyl group, the orientation of the alkyl group can be easily achieved. The method of producing the block copolymer is not limited as long as it is a living radical polymerization method other than the atom transfer radical polymerization method (ATRP method). Examples of a method that may be employed for the production include polymerization methods including: living radical polymerization methods based on the exchange chain mechanism, such as the reversible addition-fragmentation chain transfer method (RAFT method), a polymerization method using an organotellurium compound (TERP method), a polymerization method using an organoantimony compound (SBRP method), a polymerization method using an organobismuth compound (BIRP method), and the iodine transfer polymerization method; and the nitroxide-mediated-radical-polymerization method (NMP method). Among these, from the viewpoint of the controllability of the polymerization and the simplicity of the operation, the RAFT method or NMP method is preferred.

The ratio of alkyl-containing monomers to non-alkyl-containing monomers in the release agent (A) is preferably 50 to 99%, more preferably 60 to 97%, still more preferably 70 to 95% in terms of the molar ratio. In cases where the ratio of the alkyl-containing monomer is as described above, compatibility of the release agent (A) to the at least one resin or compound selected from epoxy resins, oxazoline compounds, carbodiimide compounds, melamine resins, polyester resins, acrylic resins, and urethane resins (B) can be increased to allow uniform dispersion of the release agent (A) in the resin layer, so that a resin layer that achieves light peeling can be obtained.

In cases where a resin containing an alkyl group is used as the release agent (A), the resin may also comprise a molecular structure other than the alkyl group. In particular, 2-hydroxyethyl acrylate, 3-hydroxypropyl acrylate, 4-hydroxybutyl acrylate, methoxytriethylene glycol acrylate, polyethylene glycol methyl ester acrylate, 2-hydroxyethyl methacrylate, 3-hydroxypropyl methacrylate, 4-hydroxybutyl methacrylate, methoxy triethylene glycol methacrylate, polyethylene glycol methyl ester methacrylate, or the like may be preferably used from the viewpoint of increasing the reactivity with a cross-linking agent, and increasing the compatibility with the at least one resin or compound selected from epoxy resins, oxazoline compounds, carbodiimide compounds, melamine resins, polyester resins, acrylic resins, and urethane resins (B), to obtain a uniform resin layer.

<Resin or Compound (B)>

The resin layer of the laminated film according to embodiments of the present invention may be formed with a coating agent composition comprising: a release agent; and a resin or compound. Examples of the resin or compound include at least one resin or compound selected from an epoxy resin, an oxazoline compound, a carbodiimide compound, a melamine resin, a polyester resin, an acrylic resin, and a urethane resin. Among these, a polyester resin, an acrylic resin, a melamine resin, and/or an oxazoline compound may be especially preferably used from the viewpoint of allowing cross-linking of the coating film to easily proceed, and increasing the surface elastic modulus according to AFM.

Examples of the epoxy resin include sorbitol polyglycidyl ether cross-linking agents, polyglycerol polyglycidyl ether cross-linking agents, diglycerol polyglycidyl ether cross-linking agents, and polyethylene glycol diglycidyl ether cross-linking agents. As the epoxy resin, a commercially available product may be used. Preferred examples of such a commercially available product include epoxy compounds manufactured by Nagase ChemteX Corporation "Denacol" (registered trademark) (such as EX-611, EX-614, EX-614B, EX-512, EX-521, EX-421, EX-313, EX-810, EX-830, and EX-850); diepoxy/polyepoxy compounds manufactured by Sakamoto Yakuhin Kogyo Co., Ltd. (such as SR-EG, SR-8EG, or SR-GLG); and epoxy cross-linking agents manufactured by Dainippon Ink and Chemicals Inc. "EPICLON" (registered trademark) EM-85-75W, CR-5L, and the like. In particular, epoxy resins having water solubility are preferably used.

The oxazoline compound comprises an oxazoline group therein as a functional group. The oxazoline compound preferably includes an oxazoline-group-containing copolymer which comprises at least one kind of monomer(s) comprising an oxazoline group, and which is obtained by copolymerization of the monomer(s) with at least one other kind of monomer(s).

Examples of the monomer(s) comprising an oxazoline group include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-ethyl-2-oxazoline. One of these, or a mixture of two or more of these may be used. In particular, 2-isopropenyl-2-oxazoline is preferred since it is industrially easily available.

In the oxazoline compound, the at least one other kind of monomer(s) used together with the monomer(s) comprising an oxazoline group is/are a monomer(s) copolymerizable with the monomer(s) comprising an oxazoline group, and examples of the at least one other kind of monomer(s) include acrylic acid esters and methacrylic acid esters such as methyl acrylate, methyl methacrylate, ethyl acrylate, ethyl methacrylate, butyl acrylate, butyl methacrylate, 2-ethylhexyl acrylate, and 2-ethylhexyl methacrylate; unsaturated carboxylic acids such as acrylic acid, methacrylic acid, itaconic acid and maleic acid; unsaturated nitriles such as acrylonitrile and methacrylonitrile; unsaturated amides such as acrylamide, methacrylamide, N-methylol acrylamide, and N-methylol methacrylamide; vinyl esters such as vinyl acetate and vinyl propionate; vinyl ethers such as methyl vinyl ether and ethyl vinyl ether; olefins such as ethylene and propylene; halogen-containing $\alpha,\beta$-unsaturated monomers such as vinyl chloride, vinylidene chloride, and vinyl fluoride; and $\alpha,\beta$-unsaturated aromatic monomers such as styrene and $\alpha$-methylstyrene. One of these, or a mixture of two or more of these may be used.

The carbodiimide compound is a compound comprising a carbodiimide group therein as a functional group, or comprising one or more cyanamide groups having a tautomeric relationship with the carbodiimide group in the molecule. Specific examples of such a carbodiimide compound include dicyclohexylmethane carbodiimide, dicyclohexylcarbodiimide, tetramethylxylylene carbodiimide, and urea-modified carbodiimide. One of these, or a mixture of two or more of these may be used.

Examples of the melamine resin include melamine; methylolated melamine derivatives obtained by condensation of melamine and formaldehyde; partially or completely etherified compounds obtained by reacting methylolated melamine with a lower alcohol; and mixtures thereof. The melamine resin may be either monomers, or a condensation product comprising a dimer and/or higher-order multimer; or a mixture thereof. Examples of the lower alcohol that may be used for the etherification include methyl alcohol, ethyl alcohol, isopropyl alcohol, n-butanol, and isobutanol. Regarding the functional group, an imino group, a methylol group, or an alkoxymethyl group such as a methoxymethyl group or a butoxymethyl group may be included in the molecule, and examples of the resin include imino-type methylated melamine resins, methylol-type melamine resins, methylol-type methylated melamine resins, and full-alkylation-type methylated melamine resins. Among these, a methylolated melamine resin is most preferably used.

The polyester resin is preferably a polyester resin which has an ester bond(s) in the backbone and/or a side chain(s), and which is obtained by polycondensation from a dicarboxylic acid and a diol.

As the dicarboxylic acid to be used as a raw material of the polyester resin, an aromatic, aliphatic, or alicyclic dicarboxylic acid may be used. Examples of the aromatic dicarboxylic acid include terephthalic acid, isophthalic acid, orthophthalic acid, phthalic acid, 2,5-dimethylterephthalic acid, 1,4-naphthalenedicarboxylic acid, biphenyldicarboxylic acid, 2,6-naphthalenedicarboxylic acid, 1,2-bisphenoxyethane-p,p'-dicarboxylic acid, and phenylindane dicarboxylic acid. Examples of the aliphatic or alicyclic dicarboxylic acid include succinic acid, adipic acid, sebacic acid, azelaic acid, dodecanedioic acid, dimer acid, 1,3-cyclopentanedicarboxylic acid, 1,2-cyclohexanedicarboxylic acid, and 1,4-cyclohexanedicarboxylic acid, and ester-forming derivatives thereof.

Examples of the diol component to be used as a raw material of the polyester resin include ethylene glycol, diethylene glycol, polyethylene glycol, propylene glycol, polypropylene glycol, 1,3-propanediol, 1,3-butanediol, 1,4-butanediol, 1,5-pentanediol, 1,6-hexanediol, 1,7-heptanediol, 1,8-octanediol, 1,9-nonanediol, 1,10-decanediol, 2,4-dimethyl-2-ethylhexane-1,3-diol, neopentyl glycol, 2-ethyl-2-butyl-1,3-propanediol, 2-ethyl-2-isobutyl-1,3-propanediol, 3-methyl-1,5-pentanediol, 2,2,4-trim ethyl-1,6-hexanediol, 1,2-cyclohexanedimethanol, 1,3-cyclohexanedimethanol, 1,4-cyclohexanedimethanol, 2,2,4,4-tetramethyl-1,3-cyclobutanediol, 4,4'-thiodiphenol, bisphenol A, 4,4'-methylenediphenol, 4,4'-(2-norbornylidene)diphenol, 4,4'-dihydroxybiphenol, o-, m-, and p-dihydroxybenzene, 4,4'-isopropylidenephenol, 4,4'-isopropylidenediol, cyclopentane-1,2-diol, cyclohexane-1,2'-diol, cyclohexane-1,2-diol, and cyclohexane-1,4-diol.

Further, a modified polyester copolymer, such as a block copolymer or graft copolymer modified with acryl, urethane, epoxy, or the like, may be used as the polyester resin.

The acrylic resin is not limited, and is preferably an acrylic resin comprising an alkyl methacrylate and/or alkyl acrylate.

Preferred examples of the alkyl methacrylate and/or alkyl acrylate include methacrylic acid, methyl methacrylate, ethyl methacrylate, isopropyl methacrylate, n-butyl methacrylate, isobutyl methacrylate, n-hexyl methacrylate, lauryl methacrylate, 2-hydroxyethyl methacrylate, hydroxypropyl methacrylate, acrylic acid, methyl acrylate, ethyl acrylate, isopropyl acrylate, n-butyl acrylate, isobutyl acrylate, n-hexyl acrylate, lauryl acrylate, 2-ethylhexyl acrylate, 2-hydroxyethyl acrylate, hydroxypropyl acrylate, maleic acid, itaconic acid, acrylamide, N-methylol acrylamide, and diacetone acrylamide. One of these, or two or more of these may be used.

The urethane resin is preferably a resin obtained by reacting a polyhydroxy compound and a polyisocyanate compound by a known polymerization method for urethane resins, such as emulsion polymerization or suspension polymerization.

Examples of the polyhydroxy compound include polyethylene glycol, polypropylene glycol, polyethylene-propylene glycol, polytetramethylene glycol, hexamethylene glycol, tetramethylene glycol, 1,5-pentanediol, diethylene glycol, triethylene glycol, polycaprolactone, polyhexamethylene adipate, polyhexamethylene sebacate, polytetramethylene adipate, polytetramethylene sebacate, trimethylolpropane, trimethylolethane, pentaerythritol, polycarbonate diol, and glycerin.

Examples of the polyisocyanate compound include hexamethylene diisocyanate, diphenylmethane diisocyanate, tolylene diisocyanate, isophorone diisocyanate, adducts of tolylene diisocyanate and trimethylene propane, and adducts of hexamethylene diisocyanate and trimethylolethane.

The resin layer of the laminated film according to embodiments of the present invention may comprise an isocyanate compound as the resin or compound. Examples of the isocyanate compound include tolylene diisocyanate, diphenylmethane-4,4'-diisocyanate, metaxylylene diisocyanate, hexamethylene-1,6-diisocyanate, 1,6-diisocyanatohexane, adducts of tolylene diisocyanate and hexanetriol, adducts of tolylene diisocyanate and trimethylol propane, polyol-modified diphenylmethane-4,4'-diisocyanate, carbodiimide-modified diphenylmethane-4,4'-diisocyanate, isophorone diisocyanate, 1,5-naphthalene diisocyanate, 3,3'-bitolylene-4,4'-diisocyanate, 3,3' dimethyldiphenylmethane-4,4'-diisocyanate, and metaphenylene diisocyanate.

Further, since an isocyanate group easily reacts with water, a blocked isocyanate compound, comprising an isocyanate group blocked with a blocking agent or the like, may be preferably used from the viewpoint of the pot life of the coating agent. In this case, dissociation of the blocking agent occurs when heat is applied in the drying step after the application of the coating agent composition to the polyester film. As a result, the isocyanate group is exposed to allow the cross-linking reaction to proceed.

In the coating agent composition forming the resin layer of the laminated film according to embodiments of the present invention, the mass ratio between the release agent and the resin or compound is preferably 10/90 to 100/0, more preferably within the range of 20/80 to 70/30, still more preferably within the range of 30/70 to 60/40. In cases where the mass ratio is within such a range, the amount of the release agent in the resin layer is sufficient, so that the tape peel strength and the peel strength of the surface layer can be favorable. Moreover, the amount of the resin or compound may be sufficient even in cases where the resin or compound is easily affected by heat. Therefore, delamination of the surface layer during heating can be suppressed.

<Ceramic Slurry>

An especially preferred use of the laminated film according to embodiments of the present invention is a processing film for a process that is carried out by applying a ceramic slurry to the surface of the resin layer, solidifying the ceramic slurry, and then peeling off the surface layer obtained by the solidification of the ceramic slurry. The ceramic slurry comprises a ceramic, a binder resin, and a solvent.

The raw material of the ceramic contained in the ceramic slurry is not limited, and various dielectric substances may be used as the raw material. Examples of the raw material include oxides comprising a metal such as titanium, aluminum, barium, lead, zirconium, silicon, or yttrium; barium titanate; $Pb(Mg_{1/3}, Nb_{2/3})O_3$; $Pb(Sm_{1/2}, Nb_{1/2})O_3$; $Pb(Zn_{1/3}, Nb_{2/3})O_3$; $PbThO_3$; and $PbZrO_3$. These may be used individually, or as a mixture of two or more of these.

Examples of the binder resin contained in the ceramic slurry include macromolecules such as polyurethane resins, urea resins, melamine resins, epoxy resins, vinyl acetate resins, acrylic resins, polyvinyl alcohols, and polyvinyl butyrals. These may be used individually, or as a mixture of two or more of these.

The solvent in the ceramic slurry may be either water or an organic solvent. In cases of an organic solvent, toluene, ethanol, methyl ethyl ketone, isopropyl alcohol, y-butyrolactone, or the like may be used. These may be used individually, or as a mixture of two or more of these. The ceramic slurry may also comprise a plasticizer, a dispersant, an antistatic agent, a surfactant, or the like when necessary.

<Method of Producing Laminated Film>

The method of producing the laminated film according to embodiments of the present invention is described below. The description is given using a polyester film as an example of the resin base film, but the resin base film is not limited thereto.

As a method of providing the resin layer on at least one side of the polyester film, either the in-line coating method or the off-line coating method may be used. The in-line coating method is a method in which a coating agent composition is applied during the process of producing the polyester film, more specifically, at an arbitrary stage during the course of performing melt extrusion of the polyester resin followed by biaxial drawing, heat treatment, and winding of the film. Usually, the coating agent composition is applied to

- an undrawn (unoriented) polyester film in a substantially amorphous state prepared by sufficiently drying polyethylene terephthalate pellets under vacuum, feeding the dried pellets into an extruder, carrying out melt extrusion into a sheet shape, and cooling and solidifying the melt-extruded product (Film A),
- a uniaxially drawn (uniaxially oriented) polyester film prepared by drawing Film A in the longitudinal direction (Film B), or
- a biaxially drawn (biaxially oriented) polyester film before the heat treatment, prepared by drawing Film B in the width direction (Film C).

For example, a coating agent composition prepared to have a predetermined concentration may be applied to one side of a uniaxially oriented polyester film (which corresponds to Film B) obtained by drawing an unoriented polyester film (which corresponds to Film A) in the longitudinal direction at a draw ratio of 2.5 to 5.0 using a roll heated to 80 to 120° C.

The off-line coating method is a method in which a coating agent composition is applied to the polyester film in a process that is separate from the film-forming process of the polyester film. The polyester film to which the coating agent composition is to be applied may be any of an undrawn polyester film, a uniaxially drawn polyester film, and a biaxially drawn polyester film.

In the present invention, the laminated film is preferably produced by the in-line coating method. In the production using the in-line coating method, the laminated film can be produced at a lower cost than the off-line coating method. Furthermore, a high-temperature heat treatment at not less than 200° C., which is substantially impossible for the off-line coating method, can be carried out to promote orientation of the resin layer, to satisfy $I(15°)-I(90°) \geq 0.1$. Further, since the cross-linking reaction of the coating film is also promoted, the surface elastic modulus according to AFM can be increased.

In particular, the laminated film is preferably produced by a production method comprising applying a coating agent composition containing a release agent to at least one side of the polyester film before the completion of the crystalline orientation, drawing the resulting film in at least a uniaxial direction, and then subjecting the drawn film to heat treatment to complete the crystal orientation of the polyester film. By the application of the coating agent composition to the polyester film before the completion of the crystalline orientation, a very small amount of the coating composition can be allowed to penetrate into the polyester film. Therefore, adhesion between the resin layer and the thermoplastic resin film can be achieved. As a result, excellent peel strength can be maintained. In cases where the resin layer is provided on the polyester film by the normal off-coating method, the resin layer shows poor adhesion to the film in cases where the resin layer has high hydrophobicity, which may cause loss of the resin layer by, for example, rewinding of the film roll, leading to problems such as deterioration of the peel strength.

The polyester film surface before the application may be subjected to a surface treatment such as corona discharge treatment. By carrying out the surface treatment such as corona discharge treatment, wettability of the coating agent composition to the polyester film can be increased; cissing of the coating agent composition can be prevented; and a uniform coating thickness can be achieved.

As a method of application of the coating agent composition to the polyester film, a known arbitrary application method such as bar coating, reverse coating, gravure coating, die coating, or blade coating may be used.

Subsequently, the coating agent composition is preferably dried to form the resin layer. In cases where a solvent is included in the coating agent composition, an aqueous solvent is preferably used as the solvent. By the use of the aqueous solvent, rapid evaporation of the solvent during the drying step can be suppressed to allow formation of a uniform resin layer, and moreover, the environmental load can be favorably reduced.

The aqueous solvent herein means water, or a mixture of water and a water-soluble organic solvent at an arbitrary ratio, and examples of the water-soluble organic solvent include alcohols such as methanol, ethanol, isopropyl alcohol, and butanol; ketones such as acetone and methyl ethyl ketone; and glycols such as ethylene glycol, diethylene glycol, and propylene glycol.

The solids concentration of the coating agent composition is preferably not more than 40% by mass. In cases where the solids concentration is not more than 40% by mass, favorable applicability can be given to the coating agent composition, and therefore a laminated film having a uniform resin layer can be produced. The solids concentration herein means the ratio of the mass determined by subtracting the mass of the solvent from the mass of the coating agent composition, to the mass of the coating agent composition (that is, [solids concentration]=[(mass of coating agent composition)−(mass of solvent)]/[mass of coating agent composition]).

For completing the removal of the solvent from the coating agent composition, the drying may be carried out within the temperature range of 80 to 130° C. By setting the drying temperature to a temperature higher than the melting point of the release agent, the film can be drawn while the release agent is in a molten state, so that favorable dispersibility of the release agent in the resin layer can be achieved to allow formation of a uniform resin layer without causing unevenness in the thickness.

After the drying of the solvent, the film may be drawn in the width direction at a ratio of 1.1 to 5.0. By subsequently carrying out heat treatment within a temperature range of 150 to 250° C. for 1 to 30 seconds, thermal curing of the coating agent composition can be carried out, and at the same time, crystal orientation of the polyester film can be completed. By retaining the film at 40 to 100° C. for 1 to 30 seconds in the subsequent cooling step, the molten release agent can be solidified. From the viewpoint of increasing the crystallinity and the orientation of the release agent, and satisfying I (15°)−I (90°)≥0.1, the treatment in the cooling step is more preferably carried out for at least 10 seconds at the crystallization temperature of the release agent±still more preferably at the crystallization temperature of the release agent±5° C. Further, in the heat treatment, relaxation treatment may be carried out at a ratio of 3 to 15% in the width direction or longitudinal direction, when necessary.

In particular, a method in which the coating agent composition is applied to the film uniaxially drawn in the longitudinal direction (Film B), which film is then drawn in the width direction and subjected to the heat treatment, is preferred. This is because, compared to a method in which the coating agent composition is applied to the undrawn film followed by biaxial drawing of the film, one drawing step can be omitted, so that defects and cracks of the resin layer due to drawing are less likely to occur, and hence a resin layer having excellent smoothness can be formed.

<Methods of Measuring Properties and Methods of Evaluating Effects>

The methods of measuring the properties, and the methods of evaluating the effects in the present invention are as follows.

(1) X-Ray Absorption Near Edge Structure (XANES) Spectrum

The side opposite to the resin layer surface of the laminated film was subjected to polishing treatment, to adjust the thickness of the laminated film to 10 μm. From the laminated film after the polishing treatment, a piece that is 12 mm in length and 6 mm in width was cut out to provide a measurement sample. Subsequently, the resin layer surface of the measurement sample was irradiated with X-ray, and the amount of absorption of the X-ray was measured to measure the X-ray absorption fine structure (XAFS) spectrum. The measurement conditions and the analysis conditions were as follows.

Experiment Facility: SR Center, Ritsumeikan University
Experiment Station: BL11
Spectrometer: grating spectroscope
Absorption edge: carbon K (284.2 eV) absorption edge
E0: 287.319 eV
Pre-edge range: −20 to 10 eV
Normalization range: 15 to 70 eV
Detection method: partial electron yield method based on multi-channel plate measurement
Abscissa correction: correction of the Π* peak of highly oriented pyrolytic graphite to 255.5 eV For the X-ray absorption near edge structure (XANES) spectrum at the carbon K absorption edge in the XAFS spectrum, the angle formed between the incident X-ray and the longitudinal vector of the resin layer surface of the laminated film was defined as θ, and the spectral intensity at 293.5 eV obtained by the partial electron yield method was defined as I (θ). The value obtained by subtracting the spectral intensity at θ=90° (I (90°)) from the spectral intensity at θ=15° (I (15°)) was defined as I (15°)−I (90°).

(2) Domain Size and Surface Elastic Modulus According to AFM

Using an AFM (Atomic Force Microscope) "Dimension Icon ScanAsyst", manufactured by BRUKER, absolute calibration (measurement of the warpage sensitivity, calibration of the spring constant, and measurement of the probe tip curvature (ScanAsyst Noise Threshold: 1.0 nm)) was carried out. Thereafter, measurement was carried out for the surface in the resin layer side of the laminated film, and the elastic modulus was determined from the obtained surface information.

<Measurement Conditions>

Software: "NanoScope Analysis"
Measurement probe: RTESPA-300
Measurement mode: Peak Force QNM in Air
Measurement area: 3 μm×3 μm
Measurement line number: 512 lines
Measuring speed: 0.977 Hz
Response sensitivity: 25
Indentation depth: a depth of 1/10 with respect to the thickness of the resin layer
Poisson's ratio: 0.3

More specifically, "Roughness" of "DMT Modulus" was selected after the measurement, and the image displayed on the monitor was digitized (maximum value: GPa; minimum value: 0 GPa; threshold, 180) using "Scion Image", wherein white (non-domain) was assigned to the areas with high elastic moduli, and black (domain) was assigned to the areas with low elastic moduli. Subsequently, the longest axis length was measured for each of all domains in the monitor, and the average of the five largest sizes was determined. Further, the measurement was carried out 10 times for arbitrarily selected measurement areas, and the average of the obtained values excluding the maximum value and the minimum value, that is, the average of a total of eight values, was determined as the domain size.

The surface elastic modulus was obtained as the average in the plane of the modulus mapping image obtained under the above measurement conditions. The measurement was carried out 10 times for arbitrarily selected sites, and the average of the obtained values excluding the maximum value and the minimum value, that is, the average of a total of eight values, was employed as the surface elastic modulus.

(3) Water Contact Angle

First, the laminated film was left to stand in an atmosphere at a room temperature of 23° C. with a relative humidity of 65% for 24 hours. Thereafter, in the same atmosphere, the contact angle of pure water with respect to the surface side of the resin layer of the laminated film was measured at five points using a contact angle meter Type CA-D (manufactured by Kyowa Interface Science Co., Ltd.). The average of the measured values at the five points excluding the maximum value and the minimum value, that is, the average of the measured values at three points, was determined as the water contact angle.

(4) Method of Analyzing Composition on Resin Layer Surface

Using GCIB-TOF-SIMS (GCM: Gas Cluster Ion Beam; TOF-SIMS: time-of-flight secondary ion mass spectrometry), the composition of the resin layer surface of the laminated film was analyzed. The measurement conditions were as follows.

<Sputtering Condition>

Ion source: argon gas cluster ion beam

<Detection Conditions>

Primary ion: Bi 3++(25 keV)

Secondary ion polarity: negative

Mass range: m/z 0 to 1000

Measurement area: 200×200 $\mu m^2$

The peak intensity of the fragment detected at the highest intensity was defined as K, and the peak intensity of the fragment derived from polydimethylsiloxane ($SiCH_3$+ fragment ion (M/Z=43)) was defined as P. The ratio between these, P/K, was calculated. When P/K<0.01 was satisfied, the resin layer was judged not to substantially comprise a silicone compound.

(5) Exothermic Peak Temperature (Tc) in DSC Cooling Process

In an aluminum cup having a diameter of 5 cm, 10 g of the aqueous dispersion of the release agent prepared in each Reference Example was placed. The aqueous dispersion was dried in a hot air oven under the temperature condition of 80° C.×24 hours, to prepare a dried solid sample of the release agent. The prepared solid sample of the release agent was collected in an amount of 3 mg, and subjected to measurement using a differential scanning calorimeter DSC6220 (manufactured by Hitachi High-Tech Science Corporation). First, in a nitrogen atmosphere, the sample was heated from to 200° C. under the condition of 20° C./min, and then the temperature was kept at 200° C. for 5 minutes. Thereafter, the sample was cooled to −50° C. under the condition of 20° C./min while the peak temperature of the curve obtained during the cooling was measured. The measurement was carried out three times, and the resulting average was defined as Tc. In this operation, two or more melting peak temperatures may be found within the temperature range described above, or the melting peak temperature may be a peak temperature that can be found in a multi-stage DSC chart called shoulder (found in a chart having two or more peaks overlapping with each other). In the present invention, the peak temperature showing the largest absolute value of the amount of heat (unit: mW) in the ordinate of the DSC chart was defined as Tc.

(6) Thickness of Resin Layer

The laminated film was stained using $RuO_4$ and/or $OsO_4$. Subsequently, the laminated film was frozen, and then cut in the film thickness direction, to obtain 10 ultra-thin section samples for observation of cross-sections of the resin layer. Each sample cross-section was observed at a magnification of 10,000 to 1,000,000 using a TEM (transmission electron microscope: Type H7100FA, manufactured by Hitachi, Ltd.), to obtain a photograph of the cross-section. Measured values of the resin layer thickness of the 10 samples were averaged to determine the resin layer thickness of the laminated film.

(7) HSP Distance

In a 6-mL glass screw bottle, 50 mg of a sample was placed. Each solvent in an amount of 1 mL was added thereto to immerse the whole sample in the test solvent. The sample was then left to stand for 6 hours at the treatment temperature, and the dissolution state of the sample was visually observed to rate the sample into [I] or [II] according to the following judgment criteria. The HSP value was calculated using HSP calculation software.

[I]: Neither swelling nor dissolution is found.

[II]: Swelling or dissolution is found.

In the calculation of the HSP value of each sample, the subject sample is dissolved or dispersed in a solvent having a known HSP value, and solubility or dispersibility of the sample in the particular solvent is evaluated. The evaluation of the solubility or dispersibility is carried out by visually observing whether or not each subject composition is dissolved in the solvent according to the above judgment criteria. This evaluation is carried out for a plurality of solvents. Subsequently, the obtained evaluation results on the solubility or dispersibility are plotted in a three-dimensional space composed of the dispersion term δd, polarity term δp, and hydrogen-bonding term δh of HSP (HSP space). A sphere (Hansen sphere) is prepared such that the sphere has the minimum diameter in the state where the solvents in which the subject composition is soluble or dispersible are positioned inside, and where the solvents in which the subject composition is insoluble or non-dispersible are positioned outside. The central coordinate (δd, δp, δh) of the obtained Hansen sphere is defined as the HSP value of the subject composition. For example, when the HSP value of Component 1 is defined as ($\delta d_1$, $\delta p_1$, $\delta h_1$), and the HSP value of Component 2 is defined as ($\delta d_2$, $\delta p_2$, $\delta h_2$), the HSP distance between Component 1 and Component 2 can be determined according to the following equation. Based on the HSP distance, solubility of each component can be evaluated.

$$\text{HSP Distance}=[4(\delta d_1-\delta d_2)^2+(\delta p_1-\delta p_2)^2+(\delta h_1-\delta h_2-\delta)^2]^{1/2}$$

<Measurement Conditions>

Test solvents: n-hexane, cyclohexane, methyl isobutyl ketone, n-butyl acetate, toluene, tetrahydrofuran, methyl ethyl ketone, chloroform, methyl acetate, acetone, 1,4-dioxane, pyridine, N-methylpyrrolidone, hexafluoroisopropanol, 1-butanol, acetonitrile, diethylene glycol, N,N-dimethylformamide, γ-butyrolactone, ethanol, dimethyl sulfoxide, methanol, 2-aminoethanol, cyclohexane, d-limonene, p-xylene, diiodomethane, anisole, and heptane Treatment temperature: 40° C.

Calculation software: HSPiP (Hansen Solubility Parameter in Practice) ver. 5.2.05

(8) PVB Applicability

As an index of processability of the surface layer, applicability of polyvinyl butyral (PVB) was evaluated. A PVB solution prepared as a mixture having the following composition was applied onto the resin layer of the laminated film obtained in each Example, using an applicator such that the PVB layer after drying had a thickness of 3 μm, 1 μm, or 300 nm. The film was then dried in a hot air oven at 100° C. for 3 minutes, and the presence or absence of cissing of PVB was visually observed to perform a rating according to the following judgment criteria. When the rating was A or higher, the slurry applicability was judged to be favorable. B was regarded as practically having no problem. In general, as the coating thickness of the PVB solution decreases, cissing tends to occur more frequently.

S: No cissing is found at any coating thickness.

A: No cissing is found at a coating thickness of either 3 μm or 1 μm, but cissing is found at a coating thickness of 300 nm.

B: No cissing is found at a coating thickness of 3 but cissing is found at coating thicknesses of 1 μm and 300 nm.

C: Cissing is found at any coating thickness.

<Composition of PVB Solution>

Polyvinyl butyral ("S-LEC (registered trademark)" BM-2, manufactured by Sekisui Chemical Co., Ltd.), 100 parts by mass Toluene, 150 parts by mass Ethanol, 150 parts by mass (9) PVB Peel Strength (PVB Peel Strength in Room-Temperature Atmosphere)

Regarding the PVB peel strength, the PVB solution prepared in "(8) PVB Applicability" was applied onto the resin layer of the laminated film obtained in each Example, using an applicator such that the PVB layer after drying had a thickness of 3 The film was then dried in a hot air oven at 100° C. for 3 minutes to form a PVB layer. The PVB layer was subjected to a 180° peel test at a peeling speed of 300 mm/min using a universal testing machine "Autograph AG-1S" manufactured by Shimadzu Corporation, together with a 50-N load cell. From the graph of peel strength (N)-test time (sec) obtained by the measurement, the average of the peel strength at 5 to sec was calculated. The measurement was carried out five times, and the values excluding the maximum value and the minimum value, that is, the average of three values, were determined as the peel strength of the laminated film. The rating was performed according to the following judgment criteria. When the rating was A or higher, the PVB peel strength was judged to be favorable. B was regarded as practically having no problem.

S: less than 16 mN/20 mm

A: not less than 16 mN/20 mm and less than 31 mN/20 mm

B: not less than 31 mN/20 mm and less than 61 mN/20 mm

C: not less than 61 mN/20 mm

(10) PVB Adhesion at High Temperature (PVB Peel Strength in High-Temperature Atmosphere)

As an evaluation that reproduces delamination after heat treatment, a PVB layer was provided by the same method as in "(9) PVB Peel Strength", and the PVB layer was subjected to a 180° peel test at a peeling speed of 300 mm/min using a universal testing machine "Autograph AG-1S" manufactured by Shimadzu Corporation, together with a load cell in an atmosphere at 120° C. From the graph of peel strength (N)-test time (sec) obtained by the measurement, the average of the peel strength at 5 to 10 sec was calculated. The measurement was carried out five times, and the values excluding the maximum value and the minimum value, that is, the average of three values, were determined as the peel strength of the laminated film. The rating was performed according to the following judgment criteria. When the rating was A or higher, the peel strength was judged to be favorable. B was regarded as practically having no problem.

S: not less than 50 mN/20 mm

A: not less than 40 mN/20 mm and less than 50 mN/20 mm

B: not less than 30 mN/20 mm and less than 40 mN/20 mm

C: less than 30 mN/20 mm

EXAMPLES

The laminated film according to embodiments of the present invention is described below in detail based on particular Examples. However, the present invention is not limited to these Examples.

Reference Example 1

Long-chain alkyl group-containing resin a1 was obtained through the following Step (I) and Step (II).

Step (I):

In a 25-mL pressure-resistant glass ampule for polymerization, methyl methacrylate (MMA) (manufactured by Kanto Chemical Co., Inc.), α,α'-azobisisobutyronitrile (AIBN) (manufactured by Kanto Chemical Co., Inc.) as a polymerization initiator, cumyl dithiobenzoate (CDB) as a RAFT agent, and toluene as a solvent were placed such that their weights (g) were as follows: MMA/CDB/AIBN/toluene=2.92/0.03/0.007/2.27. Subsequently, the mixed solution in the ampule was degassed twice by the freeze-degassing method, and then the ampule was sealed, followed by heating the ampule in an oil bath at 100° C. for 18 hours to obtain a reaction liquid containing a polymer (I-1).

Step (II):

To the reaction liquid in the ampule, docosyl acrylate, AIBN as a polymerization initiator, and toluene as a solvent were added such that their weights (g) were as follows: docosyl acrylate/AIBN/toluene=1.37/0.003/1.3. After carrying out freeze-degassing twice, the ampule was sealed, and heated at 100° C. for 48 hours. Thereafter, the polymerization solution was added dropwise to a 20-fold mass of hexane, and the resulting mixture was stirred to allow precipitation of solids. The obtained solids were filtered, and dried under vacuum at 40° C. overnight, to obtain a long-chain alkyl group-containing resin (a block copolymer comprising an alkyl group having 22 carbon atoms (which is referred to as long-chain alkyl group-containing resin a1)).

The obtained long-chain alkyl group-containing resin a1 was emulsified as follows to prepare an aqueous resin emulsion. In a homomixer having a capacity of 1 L, 375 g of water was placed, and then 45 g of polyoxyethylene nonylphenyl ether, 30 g of polyoxyethylene polyoxypropylene glycol, 200 g of long-chain alkyl group-containing resin a1, and 150 g of toluene were sequentially added thereto, followed by heating the resulting mixture to 70° C. and uniformly stirring the mixture. The mixed liquid was then transferred into a pressure homogenizer, and emulsified. Thereafter, toluene was removed by evaporation with heating under reduced pressure.

Reference Example 2

In a four-necked flask, 200 parts of xylene and 600 parts of octadecyl isocyanate were placed, and the resulting mixture was heated with stirring. From the time point when the reflux of xylene began, 100 parts of polyvinyl alcohol having an average degree of polymerization of 500 and a degree of saponification of 88 mol % was added thereto in small portions at 10-minute intervals for about 2 hours. After the completion of the addition of polyvinyl alcohol, the reflux was further carried out for 2 hours, and the reaction was stopped. The reaction mixture was cooled to about 80° C., and then added into methanol. As a result, precipitation of the reaction product as a white precipitate occurred. The precipitate was separated by filtration, and then 140 parts of xylene was added thereto, followed by heating the resulting mixture to allow complete dissolution, and adding methanol again thereto to allow precipitation. After repeating this operation several times, the precipitate was washed with methanol, and subjected to dry grinding, to obtain a long-chain alkyl group-containing resin (comprising polymethylene as the backbone, and an alkyl group having 18 carbon atoms as a side chain (which is referred to as long-chain alkyl group-containing resin a2)). The resin was diluted with water to 20 mass %.

Reference Example 3

Long-chain alkyl group-containing resin a3 was obtained as follows. In a stainless-steel reaction container, methyl methacrylate (α), hydroxyethyl methacrylate ((β), and octadecyl methacrylate (γ) were placed at a mass ratio of (α)/(β)/(γ)=94/1/5. As an emulsifier, 2 parts by mass of sodium dodecylbenzene sulfonate was added to a total of 100 parts by mass of (α) to (γ), and the resulting mixture was stirred to prepare Mixed Liquid 1. Subsequently, a reaction apparatus equipped with a stirrer, a reflux condensing tube, a thermometer, and a dropping funnel was provided. In the reaction apparatus, 60 parts by mass of the Mixed Liquid 1, 200 parts by mass of isopropyl alcohol, and 5 parts by mass of potassium persulfate as a polymerization initiator were placed, and the resulting mixture was heated to 60° C., to prepare Mixed Liquid 2. The Mixed Liquid 2 was maintained under the condition with heating at 60° C. for 20 minutes. A mixture of 40 parts by mass of Mixed Liquid 1, 50 parts by mass of isopropyl alcohol, and 5 parts by mass of potassium persulfate was prepared, to prepare Mixed Liquid 3. Subsequently, Mixed Liquid 3 was added dropwise to Mixed Liquid 2 using the dropping funnel for 2 hours, to prepare Mixed Liquid 4. Thereafter, the Mixed Liquid 4 was maintained under the condition with heating at 60° C. for 2 hours, and then cooled to not more than 50° C. The liquid was then transferred to a container equipped with a stirrer and decompression equipment. To the liquid, 60 parts by mass of 25% aqueous ammonia and 900 parts by mass of pure water were added. While the resulting mixture was heated to 60° C., isopropyl alcohol and unreacted monomers were recovered under reduced pressure, to obtain a long-chain alkyl group-containing resin (comprising methacrylate as the backbone, and an alkyl group having 18 carbon atoms as a side chain (which is referred to as long-chain alkyl group-containing resin a3)) dispersed in pure water.

Reference Example 4

Synthesis was carried out by the same production method as in Reference Example 1 except that octadecyl acrylate was used instead of docosyl acrylate, to obtain a long-chain alkyl group-containing resin (a block copolymer comprising an alkyl group having 18 carbon atoms (which is referred to as long-chain alkyl group-containing resin a4)). The resin was prepared into an aqueous resin emulsion in the same manner as in Reference Example 1.

Reference Example 5

Synthesis was carried out by the same production method as in Reference Example 2 except that icosyl isocyanate was used instead of octadecyl isocyanate, to obtain a long-chain alkyl group-containing resin (comprising polymethylene as the backbone, and an alkyl group having 20 carbon atoms as a side chain (which is referred to as long-chain alkyl group-containing resin a5)).

Reference Example 6

Synthesis was carried out by the same production method as in Reference Example 2 except that dodecyl isocyanate was used instead of octadecyl isocyanate, to obtain a long-chain alkyl group-containing resin (comprising polymethylene as the backbone, and an alkyl group having 12 carbon atoms as a side chain (which is referred to as long-chain alkyl group-containing resin a6)).

Reference Example 7

Synthesis was carried out by the same production method as in Reference Example 2 except that octyl isocyanate was used instead of octadecyl isocyanate, to obtain a long-chain alkyl group-containing resin (comprising polymethylene as the backbone, and an alkyl group having 8 carbon atoms as a side chain (which is referred to as long-chain alkyl group-containing resin a7)).

Reference Example 8

Long-chain alkyl group-containing resin a8 was obtained through the following Step (I) and Step (II).

Step (I):

In a 25-mL pressure-resistant glass ampule for polymerization, 2-hydroxyethyl acrylate (HEA) (manufactured by Kanto Chemical Co., Inc.), α,α'-azobisisobutyronitrile (AIBN) (manufactured by Kanto Chemical Co., Inc.) as a polymerization initiator, cumyl dithiobenzoate (CDB) as a RAFT agent, and toluene as a solvent were placed such that their weights (g) were as follows: HEA/CDB/AIBN/toluene=0.35/0.03/0.007/2.27. Subsequently, the mixed solution in the ampule was degassed twice by the freeze-degassing method, and then the ampule was sealed, followed by heating the ampule in an oil bath at 100° C. for 18 hours to obtain a reaction liquid containing a polymer (I-8).

Step (II):

To the reaction liquid in the ampule, docosyl acrylate, AIBN as a polymerization initiator, and toluene as a solvent were added such that their weights (g) were as follows: docosyl acrylate/AIBN/toluene=4.65/0.003/1.3. After carrying out freeze-degassing twice, the ampule was sealed, and heated at 100° C. for 48 hours. Thereafter, the polymerization solution was added dropwise to a 20-fold mass of hexane, and the resulting mixture was stirred to allow precipitation of solids. The obtained solids were filtered, and dried under vacuum at 40° C. overnight, to obtain a long-chain alkyl group-containing resin (a block copolymer comprising an alkyl group having 22 carbon atoms (which is referred to as long-chain alkyl group-containing resin a8)). The obtained long-chain alkyl group-containing resin a8 was emulsified in the same manner as in Reference Example 1, to prepare an aqueous resin emulsion.

Reference Example 9

Synthesis was carried out in the same manner as in Reference Example 1 except that 4-hydroxybutyl acrylate (HBA) (manufactured by Kanto Chemical Co., Inc.) was used instead of HEA as the monomers in Step I, to obtain long-chain alkyl group-containing resin a9. The obtained long-chain alkyl group-containing resin a9 was emulsified by the same method as in Reference Example 1, to prepare an aqueous resin emulsion.

Reference Example 10

Synthesis was carried out in the same manner as in Reference Example 1 except that methoxytriethylene glycol methacrylate (manufactured by Kyoeisha Chemical Co., Ltd.) was used instead of HEA as the monomers in Step I, to obtain long-chain alkyl group-containing resin a10. The obtained long-chain alkyl group-containing resin a10 was emulsified by the same method as in Reference Example 1, to prepare an aqueous resin emulsion.

Reference Example 11

Synthesis was carried out by the same production method as in Reference Example 8 except that octadecyl acrylate was used instead of docosyl acrylate, to obtain a long-chain alkyl group-containing resin (a block copolymer comprising an alkyl group having 18 carbon atoms (which is referred to as long-chain alkyl group-containing resin all)). The resin was prepared into an aqueous resin emulsion in the same manner as in Reference Example 1.

Reference Example 12

Synthesis was carried out by the same production method as in Reference Example 1 except that the weight of the HEA added was 0.16 g, and that the weight of the docosyl acrylate added was 4.84 g, to obtain long-chain alkyl group-containing resin a12. The resin was prepared into an aqueous resin emulsion in the same manner as in Reference Example 1.

Reference Example 13

An acrylic resin was obtained as follows. In a stainless-steel reaction container, methyl methacrylate (α), hydroxyethyl methacrylate (β), and urethane acrylate oligomers (Art Resin (registered trademark) UN-3320HA, manufactured by Negami Chemical Industrial Co., Ltd.; number of acryloyl groups, 6) (γ) were placed at a mass ratio of (α)/(β)/(γ)=94/1/5. As an emulsifier, 2 parts by mass of sodium dodecylbenzene sulfonate was added with respect to a total of 100 parts by mass of (α) to (γ), and the resulting mixture was stirred to prepare Mixed Liquid 5. Subsequently, a reaction apparatus equipped with a stirrer, a reflux condensing tube, a thermometer, and a dropping funnel was provided. In the reaction apparatus, 60 parts by mass of the Mixed Liquid 5, 200 parts by mass of isopropyl alcohol, and 5 parts by mass of potassium persulfate as a polymerization initiator were placed, and the resulting mixture was heated to 60° C., to prepare Mixed Liquid 6. The Mixed Liquid 6 was maintained under the condition with heating at 60° C. for 20 minutes. A mixture of 40 parts by mass of Mixed Liquid 5, 50 parts by mass of isopropyl alcohol, and 5 parts by mass of potassium persulfate was prepared, to prepare Mixed Liquid 7. Subsequently, Mixed Liquid 7 was added dropwise to Mixed Liquid 2 using the dropping funnel for 2 hours, to prepare Mixed Liquid 8. Thereafter, the Mixed Liquid 8 was maintained under the condition with heating at 60° C. for 2 hours, and then cooled to not more than 50° C. The liquid was then transferred to a container equipped with a stirrer and decompression equipment. To the liquid, 60 parts by mass of 25% aqueous ammonia and 900 parts by mass of pure water were added. While the resulting mixture was heated to 60° C., isopropyl alcohol and unreacted monomers were recovered under reduced pressure, to obtain an acrylic resin dispersed in pure water.

Reference Example 14

A polyester resin having the following copolymerization composition was prepared as an aqueous dispersion.

<Copolymerization Components>

(Dicarboxylic Acid Components)

Dimethyl 2,6-naphthalenedicarboxylate: 88 mol %

Dimethyl 5-sulfoisophthalate sodium: 12 mol %

(Diol Components)

A compound prepared by adding 2 moles of ethylene oxide to 1 mole of bisphenol S: 86 mol %

1,3-Propanediol: 14 mol %

Reference Example 15

As a silicone resin, a mixture of KM-3951, manufactured by Shin-Etsu Chemical Co., Ltd., X-52-6015, manufactured by Shin-Etsu Chemical Co., Ltd., and CAT-PM-10A, manufactured by Shin-Etsu Chemical Co., Ltd., at a mass ratio of 85:15:5 was prepared.

Reference Example 16

Synthesis was carried out by the same method as in Reference Example 1 except that 2-perfluorohexyl ethyl acrylate (synthesized by a known method using 2-perfluorohexyl ethanol as a raw material followed by purification by simple distillation) was used instead of docosyl acrylate, to obtain a fluorocarbon resin f1.

Reference Example 17

Synthesis was carried out by the same method as in Reference Example 1 except that 2-perfluorodecyl ethyl acrylate (synthesized by a known method using 2-perfluorodecyl ethanol as a raw material followed by purification by simple distillation) was used instead of docosyl acrylate, to obtain a fluorocarbon resin f2.

Example 1

Coating Agent Composition:

A coating agent composition was obtained by adding 0.1 part by mass of a fluorocarbon surfactant ("PLAS COAT" RY-2, manufactured by Goo Chemical Co., Ltd.) to 100 parts by mass of long-chain alkyl group-containing resin a1, to obtain a coating agent composition. For improvement of applicability to a polyester film, a fluorocarbon surfactant was added.

Polyester Film:

PET pellets (limiting viscosity, 0.64 dl/g) comprising 4 mass % of silica particles (primary particle size, 0.3 μm) and 2 mass % of calcium carbonate particles (primary particle size, 0.8 μm) were sufficiently dried under vacuum. Subsequently, the PET pellets were fed into an extruder, and melted at 280° C., followed by extrusion from a T-shaped die into a sheet shape. The sheet was then wound around a mirror-finished casting drum with a surface temperature of 25° C. by using the electrostatic voltage application casting method, to allow cooling and solidification of the sheet. The resulting undrawn film was heated to 90° C., and drawn in the longitudinal direction at a ratio of 3.1, to obtain a uniaxially drawn film (Film B).

Laminated Film:

The obtained uniaxially drawn film was subjected to corona discharge treatment in air, and the coating agent composition shown in Table 1 was applied thereto to a coating thickness of about 6 μm using a bar coater. Subsequently, both end portions in the width direction of the uniaxially drawn film to which the coating agent composition was applied were held with clips, and the film was introduced to a preheating zone. In the preheating zone, the ambient temperature was set to 90 to 100° C., and the solvent in the coating agent composition was dried. Subsequently, the film was continuously drawn in the width direction at a ratio of 3.6 in a drawing zone at 100° C., and then subjected to heat treatment for 20 seconds in a heat treatment zone at 230 to 240° C., followed by allowing formation of a resin layer. Further, while relaxation treatment was carried out at a ratio of 5% in the width direction at the same temperature, the film was cooled at 55° C. for 30 seconds, to obtain a laminated film in which the crystal orientation of the polyester film was completed. In the obtained laminated film, the thickness of the polyester film was 50 μm, and the thickness of the resin layer was 30 nm. Properties and the like of the laminated films obtained in Examples are shown in Tables 3 to 6.

Examples 2 to 65

Laminated films were obtained by the same method as in Example 1 except that the coating agent compositions shown in Table 1 and Table 2, and the temperature conditions shown in Table 3 and Table 4 were employed. The resins shown in Table 1 and Table 2 are as follows: as long-chain alkyl group-containing resins a1 to a12, the resins obtained in Reference Examples 1 to 12 were used; as the acrylic resin, the resin obtained in Reference Example 13 was used; and as the polyester resin, the resin obtained in Reference Example 14 was used. As the melamine resin, “NIKALAC” (registered trademark) MW-035 (solids concentration, 70 mass %; solvent, water), manufactured by SANWA Chemical Co., Ltd., was used. As the oxazoline compound, “EPOCROS” (registered trademark) WS-500 (solids concentration, 40 mass %; solvent, water), manufactured by NIPPON SHOKUBAI Co., Ltd., was used. The solid content mass ratio represents the ratio to the total mass of the resin or compound described in the table. In any of the Examples, the PVB applicability and the peeling property were favorable.

Comparative Example 1

A laminated film was obtained by the same method as in Example 1 except that no long-chain alkyl group-containing resin was substantially included, that the coating agent composition contained an olefin resin (“CHEMIPEARL” (registered trademark) XEP800H, manufactured by Mitsui Chemicals, Inc.) and the acrylic resin obtained in Reference Example 13, and that the coating agent composition shown in Table 2 and the temperature conditions shown in Table 4 were employed. Properties and the like of the obtained laminated film are shown in Table 4 and Table 6. Although the PVB applicability, and the PVB adhesion at high temperature were favorable, the PVB peeling property was poor.

Comparative Example 2

A laminated film was obtained by the same method as in Example 1 except that no long-chain alkyl group-containing resin was substantially included, that the coating agent composition contained the silicone resin prepared in Reference Example 15 and a melamine resin “NIKALAC” (registered trademark) MW-035 (solids concentration, 70 mass %; solvent, water), manufactured by SANWA Chemical Co., Ltd., and that the coating agent composition shown in Table 2 and the temperature conditions shown in Table 4 were employed. Although the PVB peeling property was favorable, the PVB applicability, and the PVB adhesion at high temperature were poor.

Comparative Example 3

A laminated film was obtained by the same method as in Example 1 except that no long-chain alkyl group-containing resin was substantially included, that the coating agent composition contained the fluorocarbon resin f1 obtained in Reference Example 16 and the acrylic resin obtained in Reference Example 13, and that the coating agent composition shown in Table 2 and the temperature conditions shown in Table 4 were employed. Although the PVB applicability, and the PVB adhesion at high temperature were favorable, the PVB peeling property was poor.

Comparative Example 4

A laminated film was obtained by the same method as in Example 1 except that long-chain alkyl group-containing resin a7 was used instead of long-chain alkyl group-containing resin a1, that the coating agent composition contained the acrylic resin obtained in Reference Example 13, and that the coating agent composition shown in Table 2 and the temperature conditions shown in Table 4 were employed. Although the PVB applicability, and the PVB adhesion at high temperature were favorable, the PVB peeling property was poor.

Comparative Example 5

A laminated film was obtained by the same method as in Example 1 except that no long-chain alkyl group-containing resin was substantially included, that the coating agent composition contained the acrylic resin obtained in Reference Example 13 and a melamine resin “NIKALAC” (registered trademark) MW-035 (solids concentration, 70 mass %; solvent, water), manufactured by SANWA Chemical Co., Ltd., and that the coating agent composition shown in Table 2 and the temperature conditions shown in Table 4 were employed. Although the PVB applicability, and the PVB adhesion at high temperature were favorable, the PVB peeling property was poor.

Comparative Example 6

A laminated film was obtained by the same method as in Example 1 except that no long-chain alkyl group-containing resin was substantially included, that the coating agent composition contained an olefin resin (“CHEMIPEARL” (registered trademark) XEP800H, manufactured by Mitsui Chemicals, Inc.) and the acrylic resin obtained in Reference Example 13, and that the coating agent composition shown in Table 2 and the temperature conditions shown in Table 4 were employed. Although the PVB applicability, and the PVB adhesion at high temperature were favorable, the PVB peeling property was poor.

Comparative Example 7

A laminated film was obtained by the same method as in Example 1 except that no long-chain alkyl group-containing resin was substantially included, that the coating agent composition contained the silicone resin prepared in Reference Example 15 and a melamine resin “NIKALAC” (registered trademark) MW-035 (solids concentration, 70 mass %; solvent, water), manufactured by SANWA Chemical Co., Ltd., and that the coating agent composition shown in Table 2 and the temperature conditions shown in Table 4 were employed. Although the PVB peeling property was favorable, the PVB applicability, and the PVB adhesion at high temperature were poor.

Comparative Example 8

A laminated film was obtained by the same method as in Example 1 except that no long-chain alkyl group-containing resin was substantially included, that the coating agent composition contained the fluorocarbon resin f1 obtained in Reference Example 17 and the acrylic resin obtained in Reference Example 13, and that the coating agent composition shown in Table 2 and the temperature conditions shown in Table 4 were employed. Although the PVB applicability, and the PVB adhesion at high temperature were favorable, the PVB peeling property was poor.

TABLE 1

| | Coating Agent Composition | | | | |
|---|---|---|---|---|---|
| | Type | Carbon Numbers | Tc (° C.) | HSP Distance from Components Other Than Release Agent ($MPa^{1/2}$) | Mass Ratio of Solid Content |
| Example 1 | Resin a1 having Long Chain Alkyl Groups | 22 | 53 | — | 100 |
| Example 2 | Resin a1 having Long Chain Alkyl Groups | 22 | 53 | 17 | 20 |
| Example 3 | Resin a1 having Long Chain Alkyl Groups | 22 | 53 | 16 | 20 |
| Example 4 | Resin a1 having Long Chain Alkyl Groups | 22 | 53 | 16 | 20 |
| Example 5 | Resin a1 having Long Chain Alkyl Groups | 22 | 53 | 17 | 20 |
| Example 6 | Resin a1 having Long Chain Alkyl Groups | 22 | 53 | 16 | 20 |
| Example 7 | Resin a1 having Long Chain Alkyl Groups | 22 | 53 | 16 | 50 |
| Example 8 | Resin a1 having Long Chain Alkyl Groups | 22 | 53 | 16 | 20 |
| Example 9 | Resin a1 having Long Chain Alkyl Groups | 22 | 53 | 15 | 20 |
| Example 10 | Resin a1 having Long Chain Alkyl Groups | 22 | 53 | 15 | 20 |
| Example 11 | Resin a1 having Long Chain Alkyl Groups | 22 | 53 | 15 | 20 |
| Example 12 | Resin a2 having Long Chain Alkyl Groups | 18 | 51 | — | 100 |
| Example 13 | Resin a2 having Long Chain Alkyl Groups | 18 | 51 | 10 | 20 |
| Example 14 | Resin a2 having Long Chain Alkyl Groups | 18 | 51 | 9 | 20 |
| Example 15 | Resin a2 having Long Chain Alkyl Groups | 18 | 51 | 9 | 20 |
| Example 16 | Resin a2 having Long Chain Alkyl Groups | 18 | 51 | 9 | 20 |
| Example 17 | Resin a2 having Long Chain Alkyl Groups | 18 | 51 | 9 | 20 |
| Example 18 | Resin a2 having Long Chain Alkyl Groups | 18 | 51 | 9 | 20 |
| Example 19 | Resin a3 having Long Chain Alkyl Groups | 18 | 19 | — | 100 |
| Example 20 | Resin a3 having Long Chain Alkyl Groups | 18 | 19 | 9 | 20 |
| Example 21 | Resin a3 having Long Chain Alkyl Groups | 18 | 19 | 8 | 20 |
| Example 22 | Resin a3 having Long Chain Alkyl Groups | 18 | 19 | 8 | 20 |
| Example 23 | Resin a4 having Long Chain Alkyl Groups | 18 | 45 | — | 100 |
| Example 24 | Resin a4 having Long Chain Alkyl Groups | 18 | 45 | 16 | 20 |
| Example 25 | Resin a4 having Long Chain Alkyl Groups | 18 | 45 | 15 | 20 |
| Example 26 | Resin a4 having Long Chain Alkyl Groups | 18 | 45 | 15 | 20 |
| Example 27 | Resin a5 having Long Chain Alkyl Groups | 20 | 37 | — | 100 |
| Example 28 | Resin a5 having Long Chain Alkyl Groups | 20 | 37 | 12 | 20 |
| Example 29 | Resin a5 having Long Chain Alkyl Groups | 20 | 37 | 11 | 20 |
| Example 30 | Resin a5 having Long Chain Alkyl Groups | 20 | 37 | 11 | 20 |
| Example 31 | Resin a6 having Long Chain Alkyl Groups | 12 | 18 | — | 100 |
| Example 32 | Resin a6 having Long Chain Alkyl Groups | 12 | 18 | 8 | 20 |
| Example 33 | Resin a6 having Long Chain Alkyl Groups | 12 | 18 | 7 | 20 |
| Example 34 | Resin a6 having Long Chain Alkyl Groups | 12 | 18 | 7 | 20 |
| Example 35 | Resin a8 having Long Chain Alkyl Groups | 22 | 55 | — | 100 |

| | Coating Agent Composition | | | |
|---|---|---|---|---|
| | Type | Mass Ratio of Solid Content | Type | Mass Ratio of Solid Content |
| Example 1 | — | — | — | — |
| Example 2 | Acrylic Resin | 80 | — | — |
| Example 3 | Acrylic Resin | 40 | Melamine Resin | 40 |
| Example 4 | Acrylic Resin | 15 | Melamine Resin | 65 |
| Example 5 | Polyester Resin | 80 | — | — |
| Example 6 | Polyester Resin | 40 | Oxazoline Compound | 40 |
| Example 7 | Polyester Resin | 25 | Oxazoline Compound | 25 |
| Example 8 | Polyester Resin | 40 | Melamine Resin | 40 |
| Example 9 | Polyester Resin | 40 | Oxazoline Compound | 40 |
| Example 10 | Polyester Resin | 40 | Oxazoline Compound | 40 |
| Example 11 | Polyester Resin | 40 | Oxazoline Compound | 40 |
| Example 12 | — | — | — | — |
| Example 13 | Acrylic Resin | 80 | — | — |
| Example 14 | Acrylic Resin | 40 | Melamine Resin | 40 |
| Example 15 | Acrylic Resin | 15 | Melamine Resin | 65 |
| Example 16 | Polyester Resin | 80 | — | — |
| Example 17 | Polyester Resin | 40 | Oxazoline Compound | 40 |
| Example 18 | Polyester Resin | 40 | Melamine Resin | 40 |
| Example 19 | — | — | — | — |
| Example 20 | Polyester Resin | 80 | — | — |
| Example 21 | Acrylic Resin | 40 | Melamine Resin | 40 |
| Example 22 | Polyester Resin | 40 | Oxazoline Compound | 40 |
| Example 23 | — | — | — | — |
| Example 24 | Polyester Resin | 80 | — | — |
| Example 25 | Acrylic Resin | 40 | Melamine Resin | 40 |
| Example 26 | Polyester Resin | 40 | Oxazoline Compound | 40 |

TABLE 1-continued

| | | | | |
|---|---|---|---|---|
| Example 27 | — | — | — | — |
| Example 28 | Polyester Resin | 80 | — | — |
| Example 29 | Acrylic Resin | 40 | Melamine Resin | 40 |
| Example 30 | Polyester Resin | 40 | Oxazoline Compound | 40 |
| Example 31 | — | — | — | — |
| Example 32 | Polyester Resin | 80 | — | — |
| Example 33 | Acrylic Resin | 40 | Melamine Resin | 40 |
| Example 34 | Polyester Resin | 40 | Oxazoline Compound | 40 |
| Example 35 | — | — | — | — |

*Notes)*

Melamine Resin: Manufactered by SANWA Chemical Co., Ltd. "NIKALAC" (Registered Trademark) MW-035 (Solid content concentration: 70 mass %, Solvent: water);
Oxazoline Compound: Manufactered by NIPPON SHOKUBAI Co., Ltd. "EPOCROS" (Registered Trademark) WS-500 (Solid content concentration: 40 mass %, Solvent: water)

TABLE 2

| | Coating Agent Composition | | | |
|---|---|---|---|---|
| | Type | Carbon Numbers | Tc (° C.) | HSP Distance from Components Other Than Release Agent (MPa$^{1/2}$) |
| Example 36 | Resin a8 having Long Chain Alkyl Groups | 22 | 55 | 11 |
| Example 37 | Resin a8 having Long Chain Alkyl Groups | 22 | 55 | 10 |
| Example 38 | Resin a8 having Long Chain Alkyl Groups | 22 | 55 | 10 |
| Example 39 | Resin a8 having Long Chain Alkyl Groups | 22 | 55 | 10 |
| Example 40 | Resin a8 having Long Chain Alkyl Groups | 22 | 55 | 10 |
| Example 41 | Resin a8 having Long Chain Alkyl Groups | 22 | 55 | 10 |
| Example 42 | Resin a8 having Long Chain Alkyl Groups | 22 | 55 | 10 |
| Example 43 | Resin a8 having Long Chain Alkyl Groups | 22 | 55 | 10 |
| Example 44 | Resin a9 having Long Chain Alkyl Groups | 22 | 57 | 11 |
| Example 45 | Resin a9 having Long Chain Alkyl Groups | 22 | 57 | 11 |
| Example 46 | Resin a9 having Long Chain Alkyl Groups | 22 | 57 | 11 |
| Example 47 | Resin a9 having Long Chain Alkyl Groups | 22 | 57 | 11 |
| Example 48 | Resin a9 having Long Chain Alkyl Groups | 22 | 57 | 10 |
| Example 49 | Resin a9 having Long Chain Alkyl Groups | 22 | 57 | 10 |
| Example 50 | Resin a9 having Long Chain Alkyl Groups | 22 | 57 | 11 |
| Example 51 | Resin a10 having Long Chain Alkyl Groups | 22 | 48 | 9 |
| Example 52 | Resin a10 having Long Chain Alkyl Groups | 22 | 48 | 9 |
| Example 53 | Resin a10 having Long Chain Alkyl Groups | 22 | 48 | 8 |
| Example 54 | Resin a10 having Long Chain Alkyl Groups | 22 | 48 | 8 |
| Example 55 | Resin a10 having Long Chain Alkyl Groups | 22 | 48 | 9 |
| Example 56 | Resin a11 having Long Chain Alkyl Groups | 18 | 43 | 10 |
| Example 57 | Resin a11 having Long Chain Alkyl Groups | 18 | 43 | 10 |
| Example 58 | Resin a11 having Long Chain Alkyl Groups | 18 | 43 | 10 |
| Example 59 | Resin a11 having Long Chain Alkyl Groups | 18 | 43 | 10 |
| Example 60 | Resin a11 having Long Chain Alkyl Groups | 18 | 43 | 10 |
| Example 61 | Resin a12 having Long Chain Alkyl Groups | 22 | 58 | 12 |
| Example 62 | Resin a12 having Long Chain Alkyl Groups | 22 | 58 | 12 |
| Example 63 | Resin a12 having Long Chain Alkyl Groups | 22 | 58 | 12 |
| Example 64 | Resin a12 having Long Chain Alkyl Groups | 22 | 58 | 12 |
| Example 65 | Resin a12 having Long Chain Alkyl Groups | 22 | 58 | 11 |

| | Coating Agent Composition | | | | |
|---|---|---|---|---|---|
| | Mass Ratio of Solid Content | Type | Mass ratio of solid content | Type | Mass ratio of solid content |
| Example 36 | 50 | Acrylic Resin | 50 | — | — |
| Example 37 | 30 | Acrylic Resin | 35 | Melamine Resin | 35 |
| Example 38 | 30 | Acrylic Resin | 10 | Melamine Resin | 60 |
| Example 39 | 30 | Acrylic Resin | 10 | Melamine Resin | 60 |
| Example 40 | 30 | Acrylic Resin | 10 | Melamine Resin | 60 |
| Example 41 | 50 | Polyester Resin | 25 | Melamine Resin | 25 |
| Example 42 | 50 | Polyester Resin | 25 | Oxazoline Compound | 25 |
| Example 43 | 50 | Polyester Resin | 10 | Oxazoline Compound | 40 |
| Example 44 | 50 | Acrylic Resin | 50 | — | — |
| Example 45 | 30 | Acrylic Resin | 35 | Melamine Resin | 35 |
| Example 46 | 30 | Acrylic Resin | 10 | Melamine Resin | 60 |
| Example 47 | 30 | Acrylic Resin | 10 | Melamine Resin | 60 |
| Example 48 | 50 | Polyester Resin | 25 | Melamine Resin | 25 |
| Example 49 | 50 | Polyester Resin | 25 | Oxazoline Compound | 25 |
| Example 50 | 50 | Polyester Resin | 10 | Oxazoline Compound | 40 |
| Example 51 | 50 | Acrylic Resin | 50 | — | — |
| Example 52 | 30 | Acrylic Resin | 10 | Melamine Resin | 60 |
| Example 53 | 50 | Polyester Resin | 25 | Melamine Resin | 25 |
| Example 54 | 50 | Polyester Resin | 25 | Oxazoline Compound | 25 |

TABLE 2-continued

| | | | | | |
|---|---|---|---|---|---|
| Example 55 | 50 | Polyester Resin | 10 | Oxazoline Compound | 40 |
| Example 56 | 50 | Acrylic Resin | 50 | — | — |
| Example 57 | 30 | Acrylic Resin | 10 | Melamine Resin | 60 |
| Example 58 | 50 | Polyester Resin | 25 | Melamine Resin | 25 |
| Example 59 | 50 | Polyester Resin | 25 | Oxazoline Compound | 25 |
| Example 60 | 50 | Polyester Resin | 10 | Oxazoline Compound | 40 |
| Example 61 | 50 | Acrylic Resin | 50 | — | — |
| Example 62 | 30 | Acrylic Resin | 10 | Melamine Resin | 60 |
| Example 63 | 50 | Polyester Resin | 25 | Melamine Resin | 25 |
| Example 64 | 50 | Polyester Resin | 25 | Oxazoline Compound | 25 |
| Example 65 | 50 | Polyester Resin | 10 | Oxazoline Compound | 40 |

| | Coating Agent Composition | | | | |
|---|---|---|---|---|---|
| | Type | Carbon Numbers | Tc (° C.) | HSP Distance from Components Other Than Release Agent(MPa$^{1/2}$) | Mass Ratio of Solid Content |
| Comparative Example 1 | Olefin Resin | x | — | 12 | 20 |
| Comparative Example 2 | Silicone Resin | x | — | 15 | 20 |
| Comparative Example 3 | Fluoro Resin f1 | x | — | 14 | 20 |
| Comparative Example 4 | Resin a7 having Long Chain Alkyl Groups | 8 | 15 | 6 | 20 |
| Comparative Example 5 | — | x | — | — | — |
| Comparative Example 6 | Olefin Resin | — | — | 12 | 30 |
| Comparative Example 7 | Silicone Resin | — | — | 15 | 30 |
| Comparative Example 8 | Fluoro Resin f2 | x | — | 16 | 70 |

| | Coating Agent Composition | | | |
|---|---|---|---|---|
| | Type | Mass ratio of solid content | Type | Mass ratio of solid content |
| Comparative Example 1 | Acrylic Resin | 80 | — | — |
| Comparative Example 2 | Melamine Resin | 80 | — | — |
| Comparative Example 3 | Acrylic Resin | 80 | — | — |
| Comparative Example 4 | Acrylic Resin | 80 | — | — |
| Comparative Example 5 | Acrylic Resin | 50 | Melamine Resin | 50 |
| Comparative Example 6 | Acrylic Resin | 70 | — | — |
| Comparative Example 7 | Melamine Resin | 70 | — | — |
| Comparative Example 8 | Acrylic Resin | 30 | — | — |

*Notes)*

Melamine Resin: Manufactered by SANWA Chemical Co., Ltd. "NIKALAC" (Registered Trademark) MW-035 (Solid content concentration: 70 mass %, Solvent: water);
Oxazoline Compound: Manufactered by NIPPON SHOKUBAI Co., Ltd. "EPOCROS" (Registered Trademark) WS-500 (Solid content concentration: 40 mass %, Solvent: water)

TABLE 3

| | Coating - Drawing Steps | | | Properties of Coating Film | |
|---|---|---|---|---|---|
| | Drying Temperature of Solvent (° C.) | Temperature of Heat Treatment (° C.) | Cooling Temperature (° C.) | I(15°) − I(90°) | Tape Peel Strength (N/19 mm) |
| Example 1 | 90 | 235 | 55 | 0.70 | 0.8 |
| Example 2 | 90 | 235 | 55 | 0.54 | 2.0 |
| Example 3 | 90 | 235 | 55 | 0.40 | 2.2 |
| Example 4 | 90 | 235 | 55 | 0.30 | 2.2 |
| Example 5 | 90 | 235 | 55 | 0.60 | 1.7 |
| Example 6 | 90 | 235 | 55 | 0.90 | 1.7 |
| Example 7 | 90 | 235 | 55 | 0.90 | 1.5 |
| Example 8 | 90 | 235 | 55 | 0.50 | 1.8 |

TABLE 3-continued

| | | | | | |
|---|---|---|---|---|---|
| Example 9 | 90 | 235 | 65 | 0.30 | 2.0 |
| Example 10 | 90 | 235 | 60 | 0.40 | 2.2 |
| Example 11 | 90 | 235 | 55 | 0.74 | 1.5 |
| Example 12 | 80 | 230 | 50 | 0.20 | 2.0 |
| Example 13 | 80 | 230 | 50 | 0.20 | 2.4 |
| Example 14 | 80 | 230 | 50 | 0.20 | 2.2 |
| Example 15 | 80 | 230 | 50 | 0.20 | 2.6 |
| Example 16 | 80 | 230 | 50 | 0.30 | 2.2 |
| Example 17 | 80 | 230 | 50 | 0.30 | 2.3 |
| Example 18 | 80 | 230 | 50 | 0.30 | 2.3 |
| Example 19 | 80 | 230 | 40 | 0.10 | 3.8 |
| Example 20 | 80 | 230 | 40 | 0.10 | 3.7 |
| Example 21 | 80 | 230 | 40 | 0.10 | 3.9 |
| Example 22 | 80 | 230 | 40 | 0.10 | 3.7 |
| Example 23 | 90 | 235 | 55 | 0.20 | 0.9 |
| Example 24 | 90 | 235 | 55 | 0.20 | 1.6 |
| Example 25 | 90 | 235 | 55 | 0.20 | 1.8 |
| Example 26 | 90 | 235 | 55 | 0.20 | 2.0 |
| Example 27 | 90 | 235 | 55 | 0.20 | 1.0 |
| Example 28 | 90 | 235 | 55 | 0.20 | 1.8 |
| Example 29 | 90 | 235 | 50 | 0.20 | 2.0 |
| Example 30 | 90 | 235 | 55 | 0.20 | 2.2 |
| Example 31 | 80 | 230 | 40 | 0.10 | 3.4 |
| Example 32 | 80 | 230 | 40 | 0.10 | 3.2 |
| Example 33 | 80 | 230 | 40 | 0.10 | 3.0 |
| Example 34 | 80 | 230 | 40 | 0.10 | 3.0 |
| Example 35 | 90 | 230 | 55 | 0.70 | 1.6 |

| | Properties of Coating Film | | | | | |
|---|---|---|---|---|---|---|
| | Domain Size (nm) | Water Contact Angle (°) | [I(15°) − 0.1]/I(90°) | Surface Elastic Modulus (Gpa) | Peak Intensity Ratio P/K | Film Thickness (nm) |
| Example 1 | 100 | 108 | 1.10 | 0.3 | less than 0.01 | 30 |
| Example 2 | 670 | 103 | 1.15 | 0.8 | less than 0.01 | 30 |
| Example 3 | 620 | 104 | 1.25 | 1.8 | less than 0.01 | 30 |
| Example 4 | 680 | 96 | 1.25 | 2.2 | less than 0.01 | 30 |
| Example 5 | 620 | 108 | 1.45 | 0.6 | less than 0.01 | 30 |
| Example 6 | 600 | 107 | 1.55 | 1.6 | less than 0.01 | 30 |
| Example 7 | 580 | 108 | 1.50 | 1.4 | less than 0.01 | 30 |
| Example 8 | 580 | 105 | 1.45 | 1.7 | less than 0.01 | 30 |
| Example 9 | 480 | 106 | 1.40 | 1.7 | less than 0.01 | 10 |
| Example 10 | 480 | 108 | 1.30 | 1.7 | less than 0.01 | 80 |
| Example 11 | 480 | 108 | 1.65 | 1.7 | less than 0.01 | 160 |
| Example 12 | 60 | 101 | 1.15 | 0.2 | less than 0.01 | 30 |
| Example 13 | 180 | 98 | 1.25 | 0.6 | less than 0.01 | 30 |
| Example 14 | 170 | 97 | 1.30 | 1.7 | less than 0.01 | 30 |
| Example 15 | 160 | 96 | 1.30 | 2.1 | less than 0.01 | 30 |
| Example 16 | 160 | 101 | 1.35 | 0.5 | less than 0.01 | 30 |
| Example 17 | 170 | 100 | 1.35 | 1.3 | less than 0.01 | 30 |
| Example 18 | 165 | 99 | 1.35 | 1.6 | less than 0.01 | 30 |
| Example 19 | 50 | 88 | 1.10 | 0.2 | less than 0.01 | 30 |
| Example 20 | 110 | 89 | 1.10 | 0.6 | less than 0.01 | 30 |
| Example 21 | 120 | 87 | 1.10 | 1.8 | less than 0.01 | 30 |
| Example 22 | 120 | 89 | 1.10 | 1.2 | less than 0.01 | 30 |
| Example 23 | 90 | 102 | 1.15 | 0.2 | less than 0.01 | 30 |
| Example 24 | 480 | 102 | 1.15 | 0.6 | less than 0.01 | 30 |
| Example 25 | 430 | 93 | 1.10 | 1.9 | less than 0.01 | 30 |
| Example 26 | 420 | 102 | 1.10 | 1.3 | less than 0.01 | 30 |
| Example 27 | 40 | 97 | 1.10 | 0.2 | less than 0.01 | 30 |
| Example 28 | 180 | 97 | 1.25 | 0.6 | less than 0.01 | 30 |
| Example 29 | 160 | 95 | 1.25 | 1.7 | less than 0.01 | 30 |
| Example 30 | 140 | 97 | 1.25 | 1.2 | less than 0.01 | 30 |
| Example 31 | 50 | 80 | 1.00 | 0.2 | less than 0.01 | 30 |
| Example 32 | 40 | 80 | 1.00 | 0.6 | less than 0.01 | 30 |
| Example 33 | 40 | 75 | 1.00 | 1.6 | less than 0.01 | 30 |
| Example 34 | 40 | 80 | 1.00 | 1.0 | less than 0.01 | 30 |
| Example 35 | 50 | 106 | 1.15 | 0.3 | less than 0.01 | 50 |

TABLE 4

| | Coating - Drawing Steps | | | Properties of Coating Film | |
|---|---|---|---|---|---|
| | Drying Temperature of Solvent (° C.) | Temperature of Heat Treatment (° C.) | Cooling Temperature (° C.) | I(15°) − I(90°) | Tape Peel Strength (N/19 mm) |
| Example 36 | 90 | 230 | 55 | 0.65 | 1.7 |
| Example 37 | 90 | 230 | 55 | 0.60 | 1.8 |
| Example 38 | 90 | 230 | 55 | 0.60 | 2.0 |
| Example 39 | 90 | 230 | 65 | 0.55 | 2.2 |
| Example 40 | 90 | 230 | 100 | 0.45 | 2.3 |
| Example 41 | 90 | 230 | 55 | 0.60 | 1.8 |
| Example 42 | 90 | 230 | 55 | 0.65 | 2.0 |
| Example 43 | 90 | 230 | 55 | 0.60 | 1.9 |
| Example 44 | 95 | 235 | 57 | 0.80 | 1.8 |
| Example 45 | 95 | 235 | 57 | 0.70 | 1.8 |
| Example 46 | 95 | 235 | 57 | 0.65 | 1.6 |
| Example 47 | 95 | 235 | 100 | 0.50 | 2.3 |
| Example 48 | 95 | 235 | 57 | 0.65 | 1.8 |
| Example 49 | 95 | 235 | 57 | 0.60 | 1.6 |
| Example 50 | 95 | 235 | 57 | 0.60 | 1.7 |
| Example 51 | 85 | 230 | 48 | 0.55 | 1.9 |
| Example 52 | 85 | 230 | 48 | 0.50 | 1.8 |
| Example 53 | 85 | 230 | 48 | 0.55 | 1.9 |
| Example 54 | 85 | 230 | 48 | 0.40 | 2.0 |
| Example 55 | 85 | 230 | 48 | 0.45 | 1.9 |
| Example 56 | 85 | 230 | 43 | 0.30 | 2.2 |
| Example 57 | 85 | 230 | 43 | 0.30 | 2.3 |
| Example 58 | 85 | 230 | 43 | 0.25 | 2.1 |
| Example 59 | 85 | 230 | 100 | 0.15 | 2.8 |
| Example 60 | 85 | 230 | 43 | 0.30 | 2.3 |
| Example 61 | 90 | 235 | 58 | 0.60 | 1.8 |
| Example 62 | 90 | 235 | 58 | 0.55 | 1.7 |
| Example 63 | 90 | 235 | 58 | 0.50 | 1.6 |
| Example 64 | 90 | 235 | 100 | 0.30 | 2.3 |
| Example 65 | 90 | 235 | 58 | 0.45 | 1.9 |

| | Properties of Coating Film | | | | | |
|---|---|---|---|---|---|---|
| | Domain Size (nm) | Water Contact Angle (°) | [I(15°) − 0.1]/I(90°) | Surface Elastic Modulus (Gpa) | Peak Intensity Ratio P/K | Film Thickness (nm) |
| Example 36 | 230 | 105 | 1.15 | 0.6 | less than 0.01 | 50 |
| Example 37 | 185 | 104 | 1.25 | 1.8 | less than 0.01 | 80 |
| Example 38 | 160 | 103 | 1.45 | 2.0 | less than 0.01 | 50 |
| Example 39 | 160 | 104 | 1.55 | 2.2 | less than 0.01 | 50 |
| Example 40 | 160 | 103 | 1.35 | 2.3 | less than 0.01 | 50 |
| Example 41 | 90 | 105 | 1.45 | 1.5 | less than 0.01 | 80 |
| Example 42 | 95 | 108 | 1.35 | 1.2 | less than 0.01 | 50 |
| Example 43 | 180 | 109 | 1.45 | 1.6 | less than 0.01 | 50 |
| Example 44 | 240 | 107 | 1.15 | 0.4 | less than 0.01 | 30 |
| Example 45 | 220 | 106 | 1.70 | 1.8 | less than 0.01 | 50 |
| Example 46 | 210 | 107 | 1.80 | 2.0 | less than 0.01 | 50 |
| Example 47 | 210 | 104 | 1.75 | 2.1 | less than 0.01 | 50 |
| Example 48 | 200 | 110 | 1.75 | 1.6 | less than 0.01 | 100 |
| Example 49 | 180 | 109 | 1.35 | 1.3 | less than 0.01 | 50 |
| Example 50 | 210 | 110 | 1.45 | 1.7 | less than 0.01 | 50 |
| Example 51 | 90 | 105 | 1.15 | 0.5 | less than 0.01 | 20 |
| Example 52 | 85 | 106 | 1.55 | 2.1 | less than 0.01 | 50 |
| Example 53 | 86 | 106 | 1.65 | 1.7 | less than 0.01 | 50 |
| Example 54 | 83 | 107 | 1.30 | 1.3 | less than 0.01 | 50 |
| Example 55 | 84 | 105 | 1.45 | 1.6 | less than 0.01 | 10 |
| Example 56 | 145 | 104 | 1.15 | 0.4 | less than 0.01 | 50 |
| Example 57 | 130 | 105 | 1.35 | 2.1 | less than 0.01 | 50 |
| Example 58 | 87 | 105 | 1.25 | 1.6 | less than 0.01 | 50 |
| Example 59 | 98 | 103 | 1.25 | 1.3 | less than 0.01 | 50 |
| Example 60 | 95 | 106 | 1.25 | 1.6 | less than 0.01 | 60 |
| Example 61 | 236 | 108 | 1.10 | 0.4 | less than 0.01 | 50 |
| Example 62 | 210 | 109 | 1.45 | 2.3 | less than 0.01 | 50 |
| Example 63 | 350 | 109 | 1.45 | 1.6 | less than 0.01 | 70 |
| Example 64 | 450 | 110 | 1.20 | 1.2 | less than 0.01 | 50 |
| Example 65 | 250 | 106 | 1.25 | 1.7 | less than 0.01 | 150 |

TABLE 4-continued

| | Coating - Drawing Steps | | | Properties of Coating Film | |
|---|---|---|---|---|---|
| | Drying Temperature of Solvent (° C.) | Temperature of Heat Treatment (° C.) | Cooling Temperature (° C.) | I(15°) − I(90°) | Tape Peel Strength (N/19 mm) |
| Comparative Example 1 | 90 | 230 | 100 | 0.00 | 3.9 |
| Comparative Example 2 | 90 | 230 | 100 | 0.00 | 1.5 |
| Comparative Example 3 | 90 | 230 | 110 | 0.00 | 3.2 |
| Comparative Example 4 | 90 | 230 | 100 | 0.05 | 3.5 |
| Comparative Example 5 | 90 | 230 | 100 | 0.00 | 5.5 |
| Comparative Example 6 | 90 | 230 | 100 | 0.05 | 3.8 |
| Comparative Example 7 | 90 | 230 | 100 | 0.05 | 1.2 |
| Comparative Example 8 | 90 | 230 | 100 | 0.00 | 3.6 |

| | Properties of Coating Film | | | | | |
|---|---|---|---|---|---|---|
| | Domain Size (nm) | Water Contact Angle (°) | [I(15°) − 0.1]/I(90°) | Surface Elastic Modulus (Gpa) | Peak Intensity Ratio P/K | Film Thickness (nm) |
| Comparative Example 1 | 90 | 85 | 0.90 | 0.2 | less than 0.01 | 30 |
| Comparative Example 2 | 550 | 111 | 0.90 | 0.8 | 0.65 | 30 |
| Comparative Example 3 | 490 | 94 | 0.95 | 0.6 | less than 0.01 | 30 |
| Comparative Example 4 | 40 | 80 | 1.05 | 0.9 | less than 0.01 | 30 |
| Comparative Example 5 | 20 | 75 | 0.90 | 1.6 | less than 0.01 | 30 |
| Comparative Example 6 | 120 | 85 | 0.90 | 0.7 | less than 0.01 | 50 |
| Comparative Example 7 | 510 | 112 | 0.90 | 0.9 | 0.65 | 100 |
| Comparative Example 8 | 530 | 110 | 0.90 | 0.6 | less than 0.01 | 30 |

TABLE 5

| | PVB Coating Property | PVB Peal Strength @ room temperature | | PVB Adhesiveness at high temperature @ 120° C. | |
|---|---|---|---|---|---|
| | Evaluation | Peel Strength (mN/20 mm) | Evaluation | Peel Strength (mN/20 mm) | Evaluation |
| Example 1 | A | 31 | B | 55 | S |
| Example 2 | S | 20 | A | 25 | C |
| Example 3 | A | 25 | A | 31 | B |
| Example 4 | S | 25 | A | 32 | B |
| Example 5 | A | 15 | S | 20 | C |
| Example 6 | A | 10 | S | 15 | C |
| Example 7 | A | 10 | S | 15 | C |
| Example 8 | A | 15 | S | 20 | C |
| Example 9 | A | 20 | A | 35 | B |
| Example 10 | A | 25 | A | 38 | B |
| Example 11 | A | 10 | S | 31 | B |
| Example 12 | A | 50 | B | 62 | S |
| Example 13 | A | 30 | A | 45 | A |
| Example 14 | A | 30 | A | 45 | A |
| Example 15 | A | 35 | A | 48 | A |
| Example 16 | A | 25 | A | 44 | A |
| Example 17 | A | 25 | A | 43 | A |
| Example 18 | A | 25 | A | 44 | A |
| Example 19 | A | 60 | B | 70 | S |
| Example 20 | A | 35 | B | 45 | A |
| Example 21 | A | 40 | B | 48 | A |

TABLE 5-continued

| | PVB Coating Property | PVB Peal Strength @ room temperature | | PVB Adhesiveness at high temperature @ 120° C. | |
|---|---|---|---|---|---|
| | Evaluation | Peel Strength (mN/20 mm) | Evaluation | Peel Strength (mN/20 mm) | Evaluation |
| Example 22 | A | 35 | B | 42 | A |
| Example 23 | A | 55 | B | 58 | S |
| Example 24 | A | 30 | B | 32 | B |
| Example 25 | A | 35 | B | 39 | B |
| Example 26 | A | 32 | B | 37 | B |
| Example 27 | A | 50 | B | 60 | S |
| Example 28 | A | 20 | A | 42 | A |
| Example 29 | A | 25 | A | 48 | A |
| Example 30 | A | 20 | A | 41 | A |
| Example 31 | S | 40 | B | 64 | S |
| Example 32 | S | 35 | B | 55 | S |
| Example 33 | S | 38 | B | 60 | S |
| Example 34 | S | 35 | B | 54 | S |
| Example 35 | S | 55 | B | 60 | S |

TABLE 6

| | PVB Coating | PVB Peal Strength @ room temperature | | PVB Adhesiveness at high temperature @ 120° C. | |
|---|---|---|---|---|---|
| | Property Evaluation | Peel Strength (mN/20 mm) | Eval-uation | Peel Strength (mN/20 mm) | Eval-uation |
| Example 36 | S | 40 | B | 45 | A |
| Example 37 | S | 30 | A | 43 | A |
| Example 38 | S | 14 | S | 43 | A |
| Example 39 | S | 15 | S | 42 | A |
| Example 40 | S | 20 | A | 48 | A |
| Example 41 | S | 15 | S | 51 | S |
| Example 42 | A | 28 | A | 52 | S |
| Example 43 | A | 15 | S | 41 | A |
| Example 44 | A | 48 | B | 49 | A |
| Example 45 | S | 15 | S | 42 | A |
| Example 46 | S | 14 | S | 43 | A |
| Example 47 | S | 15 | S | 44 | A |
| Example 48 | B | 14 | S | 45 | A |
| Example 49 | B | 22 | A | 45 | A |
| Example 50 | B | 15 | S | 41 | A |
| Example 51 | S | 50 | B | 68 | S |
| Example 52 | S | 13 | S | 55 | S |
| Example 53 | S | 14 | S | 52 | S |
| Example 54 | S | 15 | A | 54 | S |
| Example 55 | S | 14 | S | 56 | S |
| Example 56 | S | 55 | B | 44 | A |
| Example 57 | S | 22 | A | 43 | A |
| Example 58 | S | 26 | A | 52 | S |
| Example 59 | S | 35 | B | 58 | S |
| Example 60 | S | 25 | A | 53 | S |
| Example 61 | A | 50 | B | 45 | A |
| Example 62 | B | 14 | S | 42 | A |
| Example 63 | B | 15 | S | 32 | B |
| Example 64 | B | 31 | B | 38 | B |
| Example 65 | A | 18 | A | 44 | A |
| Comparative Example 1 | S | 70 | C | 90 | S |
| Comparative Example 2 | C | 10 | S | 12 | C |
| Comparative Example 3 | S | 70 | C | 49 | A |
| Comparative Example 4 | S | 65 | C | 70 | S |
| Comparative Example 5 | S | 100 | C | 120 | S |
| Comparative Example 6 | S | 65 | C | 80 | S |
| Comparative Example 7 | C | 10 | S | 15 | C |
| Comparative Example 8 | B | 61 | C | 29 | C |

The laminated film according to embodiments of the present invention provides excellent applicability and an excellent peeling property, and also provides excellent adhesion at high temperature, for a surface layer represented by a ceramic slurry. Thus, the laminated film of the present invention can be suitably used as a processing film for the production process of an electronic component.

The invention claimed is:

1. A laminated film comprising a resin layer on at least one side of a resin base film, the resin layer being present on at least one surface, wherein in an X-ray absorption fine structure (XAFS) spectrum measured for the resin layer surface by the partial electron yield method, an X-ray absorption near edge structure (XANES) spectrum at the carbon K absorption edge satisfies I (15°)–I (90°)>0.1 when the angle formed between the incident X-ray and the resin layer surface is defined as θ, and the spectral intensity at 293.5 eV is defined as I (θ), wherein when a surface of the resin layer is analyzed by time-of-flight secondary ion mass spectrometry, the ratio of the peak intensity of the fragment derived from polydimethylsiloxane (P) to the peak intensity of the fragment detected at the highest intensity (K)(P/K)[–] is less than 0.01; and wherein the resin layer is formed from a coating agent composition consisting essentially of at least 20% by mass of a (i) release agent (A) consisting of a block copolymer that contains a unit which is a $C_{12}$ to $C_{25}$ carbon chain alkyl resin; (ii) no greater than 80% by mass of one or more of an acrylic resin, a polyester resin, a melamine resin, and an oxazoline compound; and (iii) optionally, one or more additives selected from the group consisting of an antioxidant, a thermal stabilizer, a weathering stabilizer, an ultraviolet absorber, an organic lubricant, a pigment, a dye, an organic or inorganic particle, a filler, an antistatic agent, a nucleating agent, and fluorocarbon surfactant.

2. The laminated film according to claim 1, wherein the surface elastic modulus of the resin layer as measured by an atomic force microscope (AFM) is not less than 1 GPa.

3. The laminated film according to claim 1, wherein the laminated film has a tape peel strength of not more than 3.0 N/19 mm, and has a domain size of not more than 500 nm as observed in a modulus mapping image by AFM.

4. The laminated film according to claim 1, wherein the resin layer has a water contact angle of not less than 85° to not more than 110°.

5. The laminated film according to claim 1, wherein in an XAFS spectrum measured for the resin layer surface by the partial electron yield method, an X-ray absorption near edge structure (XANES) spectrum at the carbon K absorption edge satisfies [I (15°)–0.1]/I)(90°)>1 when the angle formed between the incident X-ray and the resin layer surface is defined as θ, and the spectral intensity at 293.5 eV is defined as I (θ).

6. The laminated film according to claim 1, wherein when the $C_{12}$ to $C_{25}$ carbon chain alkyl resin is heated from 25° C. to 200° C. at 20° C./min and then cooled from 200° C. to –50° C. at 20° C./min using a differential scanning calorimeter (DSC), the exothermic peak temperature (Tc) in the cooling process is not less than 30° C.

7. The laminated film according to claim 1, wherein the resin layer has a film thickness of more than 10 nm and less than 200 nm.

8. The laminated film according to claim 1, wherein the resin base film is a polyester film.

9. The laminated film according to claim 8, wherein the polyester film comprises one or more members selected from the group consisting of poly(ethylene terephthalate), poly(propylene terephthalate), poly(ethylene-2,6-naphthalate), poly(butylene terephthalate), poly(propylene-2,6-naphthalate), poly(ethylene-2,6-naphthalate), and poly(ethylene-α,β-bis(2-chlorophenoxy)ethane-4,4-dicarboxylate).

10. The laminated film according to claim 1, for use in an application that is carried out by applying a ceramic slurry to the surface of the resin layer, solidifying the ceramic slurry, and then peeling off the solidified ceramic slurry.

11. The laminated film according to claim 1, wherein the coating agent composition consists of at least 20% by mass of the release agent (A) and no greater than 80% by mass of one or both of the polyester resin and the oxazoline compound.

12. The laminated film according to claim 1, wherein the coating agent composition consists of at least 20% by mass of the release agent (A) and no greater than 80% by mass of one or both of the acrylic resin and the melamine resin.

* * * * *